US011504621B2

(12) United States Patent
Odagiri et al.

(10) Patent No.: US 11,504,621 B2
(45) Date of Patent: *Nov. 22, 2022

(54) VIDEO GAME PROCESSING PROGRAM, VIDEO GAME PROCESSING SYSTEM AND VIDEO GAME PROCESSING METHOD

(71) Applicant: KABUSHIKI KAISHA SQUARE ENIX, Tokyo (JP)

(72) Inventors: Kei Odagiri, Tokyo (JP); Hiroaki Ohno, Tokyo (JP)

(73) Assignee: KABUSHIKI KAISHA SQUARE ENIX, Tokyo (JP)

( * ) Notice: Subject to any disclaimer, the term of this patent is extended or adjusted under 35 U.S.C. 154(b) by 283 days.

This patent is subject to a terminal disclaimer.

(21) Appl. No.: 16/922,546

(22) Filed: Jul. 7, 2020

(65) Prior Publication Data
US 2020/0330872 A1 Oct. 22, 2020

Related U.S. Application Data

(63) Continuation of application No. 16/366,398, filed on Mar. 27, 2019, now Pat. No. 10,737,177, which is a
(Continued)

(51) Int. Cl.
*A63F 13/00* (2014.01)
*A63F 13/63* (2014.01)
(Continued)

(52) U.S. Cl.
CPC .............. *A63F 13/63* (2014.09); *A63F 13/35* (2014.09); *A63F 13/5255* (2014.09); *A63F 13/537* (2014.09); *A63F 13/56* (2014.09)

(58) Field of Classification Search
None
See application file for complete search history.

(56) References Cited

U.S. PATENT DOCUMENTS 6,115,053 A 9/2000 Perlin
6,285,380 B1 9/2001 Perlin et al.
(Continued)

FOREIGN PATENT DOCUMENTS

EP 0992266 4/2000
JP 2000-107443 4/2000
(Continued)

OTHER PUBLICATIONS

Office Action from Japan Patent Office (JPO) in Japanese Patent Appl. No. 2015-185408, dated Oct. 25, 2016, together with a partial English language translation.
(Continued)

*Primary Examiner* — Paul A D'Agostino
(74) *Attorney, Agent, or Firm* — Greenblum & Bernstein, P.L.C.

(57) ABSTRACT

A video game processing program product causes a user terminal to realize functions to control progress of a video game. The functions include: an updating function configured to update a position of a character; a first displaying function configured to display, in a normal mode, a normal game screen; and a second displaying function configured to display, in a photographing mode, a photographing game screen based on a photographing operation. In a first case where a user operates the user character to change position while the photographing screen is displayed in the photographing mode, a change in position of the user character does not affect a status of the normal mode. The status of the normal mode of the video game is configured to be updated in a second case while the photographing screen is displayed in the photographing mode.

20 Claims, 11 Drawing Sheets

Related U.S. Application Data continuation of application No. 15/890,784, filed on Feb. 7, 2018, now Pat. No. 10,265,623, which is a continuation of application No. 15/045,623, filed on Feb. 17, 2016, now Pat. No. 9,919,216.

(51) Int. Cl.
| | |
|---|---|
| A63F 13/5255 | (2014.01) |
| A63F 13/56 | (2014.01) |
| A63F 13/35 | (2014.01) |
| A63F 13/537 | (2014.01) |

(56) References Cited

U.S. PATENT DOCUMENTS

| | | | | |
|---|---|---|---|---|
| 6,317,132 | B1 | 11/2001 | Perlin | |
| 7,684,592 | B2* | 3/2010 | Paul | G06V 40/20 382/209 |
| 8,253,746 | B2* | 8/2012 | Geisner | G06F 3/017 345/474 |
| 9,123,272 | B1* | 9/2015 | Baldwin | G09G 3/003 |
| 10,944,960 | B2* | 3/2021 | Matsunobu | H04N 13/25 |
| 11,009,991 | B2* | 5/2021 | Watanabe | H04N 5/232935 |
| 2004/0028397 | A1* | 2/2004 | Maekawa | G03B 17/53 396/2 |
| 2004/0119733 | A1* | 6/2004 | Morimoto | A63F 13/655 715/733 |
| 2004/0166928 | A1* | 8/2004 | Kumagai | G07F 17/32 463/20 |
| 2005/0064926 | A1* | 3/2005 | Walker | H04N 7/18 463/16 |
| 2005/0187015 | A1* | 8/2005 | Suzuki | A63F 13/5255 463/32 |
| 2006/0279627 | A1* | 12/2006 | Yamamoto | G07F 17/16 348/14.14 |
| 2007/0298878 | A1 | 12/2007 | Short | |
| 2008/0076546 | A1* | 3/2008 | Moyle | G07F 17/3234 463/29 |
| 2008/0086696 | A1* | 4/2008 | Sri Prakash | G06Q 10/00 715/757 |
| 2008/0252596 | A1* | 10/2008 | Bell | G06F 3/0304 345/156 |
| 2008/0305856 | A1* | 12/2008 | Walker | G07F 17/3269 463/20 |
| 2010/0210358 | A1* | 8/2010 | Csurka | A63F 13/655 463/31 |
| 2011/0045904 | A1* | 2/2011 | Kawamoto | A63F 13/215 463/44 |
| 2011/0312414 | A1* | 12/2011 | O'Donnell | G06Q 30/02 463/31 |
| 2012/0092367 | A1* | 4/2012 | Suzuki | G06T 19/006 345/632 |
| 2012/0157200 | A1* | 6/2012 | Scavezze | H04N 5/225 463/31 |
| 2012/0257080 | A1* | 10/2012 | Cheruel | G09G 3/3406 348/E5.022 |
| 2012/0314024 | A1* | 12/2012 | Tsang | G09G 3/003 348/E13.001 |
| 2013/0018667 | A1* | 1/2013 | Nudd | G16H 40/20 705/2 |
| 2013/0023338 | A1* | 1/2013 | Layne, IV | G07F 17/3255 463/25 |
| 2013/0035144 | A1* | 2/2013 | Karn | G07F 17/3227 463/16 |
| 2013/0035155 | A1* | 2/2013 | Layne, IV | A63F 13/69 463/25 |
| 2013/0035156 | A1* | 2/2013 | Karn | G07F 17/3267 463/27 |
| 2013/0035161 | A1* | 2/2013 | Layne, IV | A63F 13/798 463/31 |
| 2013/0035168 | A1* | 2/2013 | Layne, IV | G07F 17/3227 463/42 |
| 2013/0036458 | A1* | 2/2013 | Liberman | G06F 21/32 726/5 |
| 2013/0070093 | A1* | 3/2013 | Rivera | G06Q 20/123 348/143 |
| 2013/0109478 | A1* | 5/2013 | Matsumaru | A63F 13/213 463/39 |
| 2013/0113738 | A1* | 5/2013 | Lee | G06F 3/0488 345/173 |
| 2013/0117377 | A1* | 5/2013 | Miller | G06F 3/013 709/205 |
| 2013/0222273 | A1* | 8/2013 | Tan | A63F 13/285 345/173 |
| 2013/0252742 | A1* | 9/2013 | Shimono | A63F 13/843 463/43 |
| 2013/0265502 | A1* | 10/2013 | Huebner | G06T 15/20 348/789 |
| 2013/0286264 | A1* | 10/2013 | Kamikura | G03B 17/14 348/789 |

FOREIGN PATENT DOCUMENTS

| | | |
|---|---|---|
| JP | 2003-033568 | 2/2003 |
| JP | 2004-070821 | 3/2004 |
| JP | 2008-079810 | 4/2008 |
| JP | 2010-099211 | 5/2010 |
| JP | 2012-069126 | 4/2012 |
| WO | 98/06043 | 2/1998 |

OTHER PUBLICATIONS

Junpoco, "3DS ver. 'Dragon Quest VIII', Omoide no Syashin ga Nokoseru Shin-Yoso'Photographing Function' no Joho wo Kokai", 4Gamer.net, pp. 1-5 (Jul. 23, 2015), available at http://www.4gamer.net/games/301/G030150/20150721009/, together with a partial English language translation.

Enterbrain Inc., "New Loveplus", Weekly Famitsu, vol. 26 No. 27, pp. 280-281 (Jun. 16, 2011), together with a partial English language translation.

Enterbrain Inc., "Dream Club ZERO", Famitsu box360, vol. 9 No. 12, pp. 64-65. (Oct. 30, 2010).

Ambit Inc., "New Loveplus no NEW na Ohanashi", Nintendo DREAM, vol. 208, pp. 38-39 (Aug. 1, 2011).

Ambit Inc., "Dragon Quest X-Awakened Five Tribes Online", Nintendo DREAM, vol. 216, pp. 124-125 (Apr. 1, 2012).

Ambit Inc., "Denpa Ningen no RPG2", Nintendo DREAM, vol. 223, p. 70 (Nov. 1, 2012).

Godzilla OTA, "Dragon Quest X-Tradition of Ancient Dragon Online ver.3", Weekly Famitsu, vol. 30 No. 30, p. 182 (Jul. 9, 2015).

Extended European Search Report from European Patent Office (EPO) in European Patent Appl. No. 16156204.6, dated Feb. 17, 2017.

Office Action from Japan Patent Office (JPO) in Japanese Patent Appl. No. 2017-094748, dated May 15, 2018, together with a partial English language translation.

"Natsuiro High School, Seishun Hakusyo (Ryaku), Official CompleteGuide", Japan, Kadokawa Corp., Jul. 2, 2015, First Edition, p. 016, 132, together with a partial English language translation.

"Photokano Kiss Official CompleteGuide", Japan, Enterbrain Inc., Jul. 3, 2013, First Edition, p. 018-019, together with a partial English language translation.

"VJump Books, Nintendo 3DS Ver., Bandai Namco Games Official CompleteGuide, Kuroko's Basketball—Syori heno Kiseki—Perfect DirectionBook", Japan, Shueisha Inc., Feb. 25, 2014, together with a partial English language translation.

"The Idolmaster 2", GEMAGA 2011 the Sep. vol., Japan, Softbank Creative Corp., Sep. 1, 2011, vol. 28, No. 9, p. 22, 24, together with a partial English language translation.

"Phantasy Star Online 2, Step up Guide", Japan, Enterbrain Inc., Apr. 11, 2013, p. 5, the Special supplements of Famitsu PS Vita vol. 2, together with a partial English language translation.

(56) References Cited

OTHER PUBLICATIONS

"Phantasy Star Online 2", Monthly Famitsu Connect! On the Jul. 2015, Japan, Kadokawa Dwango Corporation, May 27, 2015, vol. 5, No. 7, p. 75, 81.
"Dragon Quest X-Awakened Five Tribes Online", Monthly Famitsu Connect! On the Aug. 2012, Japan, Enterbrain Inc., Jun. 27, 2012, vol. 2, No. 8, p. 21, 23.
Office Action from Japan Patent Office (JPO) in Japanese Patent Appl. No. 2017-094748, dated Oct. 16, 2018, together with a partial English language translation.
"Doragon Quest X Awakened five tribes online", monthly Fami-Tsu Connect! On, vol. 2, No. 8, Enterbrain Inc., pp. 21, 23 (Jun. 27, 2012), together with a partial English language translation.
European Search Report from European Patent Office (EPO) in European Patent Appl. No. 16156204.6, dated Jul. 29, 2019.

* cited by examiner

PHOTOGRAPHING-SCREEN RELATED INFORMATION

| SUBJECT | KIND | STORAGE OF COORDINATE | STORAGE OF DIRECTION | CAMERA EYE LINE | EMOTE | ... |
|---|---|---|---|---|---|---|
| ONESELF (USER WHO CARRIES OUT PHOTOGRAPHING OPERATION; PC) | PC | 1 | 1 | 1 | 1 | ... |
| PARTY MEMBER OF PC | PC | 1 | 1 | 1 | 1 | ... |
| UNION MEMBER | PC | 1 | 1 | 1 | 1 | ... |
| PC RELATED CHARACTER | NPC | 1 | 1 | 0 | 0 | ... |
| ⋮ | ⋮ | ⋮ | ⋮ | ⋮ | ⋮ | ⋮ |

(A)

(B)

VIDEO GAME PROCESSING PROGRAM, VIDEO GAME PROCESSING SYSTEM AND VIDEO GAME PROCESSING METHOD

CROSS-REFERENCE TO RELATED APPLICATION

This is a continuation of U.S. patent application Ser. No. 16/366,398, filed Mar. 27, 2019, which is a continuation of U.S. patent application Ser. No. 15/890,784, filed Feb. 7, 2018 and now U.S. Pat. No. 10,265,623 issued Apr. 23, 2019, which is a continuation of U.S. patent application Ser. No. 15/045,623, filed Feb. 17, 2016 and now U.S. Pat. No. 9,919,216 issued Mar. 20, 2018, which claims the benefit of Japanese Patent Application No. 2015-185408, filed Sep. 18, 2015. The disclosure of each of the above applications is expressly incorporated herein by reference in its entirety.

BACKGROUND OF THE INVENTION

1. Field of the Invention

At least one of embodiments according to the present invention relates to a non-transitory computer-readable medium including a video game processing program, and a video game processing system and a video game processing method for causing a user terminal to realize functions to control progress of a video game in response to an operation of a user.

2. Description of the Related Art

Heretofore, various systems have been proposed for storing and using images of a video game as screenshots.

In such systems, for example, there is one that is configured so that a stored screenshot is transmitted to a server and is then utilized (see Japanese Patent Application Publication No. 2010-99211).

However, in the conventional system, there is a case where it is difficult for the user to obtain a screenshot as intended by the user in accordance with a status of the video game. Namely, in order to create a game screen displayed in accordance with the status of the video game in a user's intended form, the user may be required to be skilled in the video game to the extent. Further, such a problem easily occurs in particular in a case where an object that acts independently of an operation of the user (an NPC or a character of other user) is included in the game screen.

SUMMARY OF THE INVENTION

It is an object of at least one of embodiments according to the present invention to solve the problem described above, and to provide a user with a video game in which it is easy for the user to obtain an intended screenshot.

According to one non-limiting aspect of the present invention, there is provided a non-transitory computer-readable medium including a video game processing program product for causing a user terminal to realize functions to control progress of a video game in response to an operation of a user. In this case, the functions include: an updating function configured to update a position of a character on a virtual space on the basis of a moving operation by one user or a plurality of users, the one user or each of the plurality of users being capable of operating the character; a first displaying function configured to display a game screen (hereinafter, referred to as a "normal screen") corresponding to the one user or each of the plurality of users on the basis of an update result by the updating function; a second displaying function configured to display a game screen (hereinafter, referred to as a "photographing screen") on the basis of a photographing operation, an object other than the character of the user (hereinafter, referred to as a "user character") carrying out a predetermined action (hereinafter, referred to as a "photographing action") on the photographing screen when the photographing operation is carried out, the object (hereinafter, referred to as a "photographing subject") satisfying a predetermined condition; and a storing function configured to store at least apart of the photographing screen in a predetermined storage region on the basis of a storing operation.

According to another non-limiting aspect of the present invention, there is provided a video game processing system including a communication network, a server and a user terminal, the video game processing system being configured to control progress of a video game in response to an operation of a user. The video game processing system according to one embodiment of the present invention includes: an updating section configured to update a position of a character on a virtual space on the basis of a moving operation by one user or a plurality of users, the one user or each of the plurality of users being capable of operating the character; a first displaying section configured to display a game screen (hereinafter, referred to as a "normal screen") corresponding to the one user or each of the plurality of users on the basis of an update result by the updating function; a second displaying section configured to display a game screen (hereinafter, referred to as a "photographing screen") on the basis of a photographing operation, an object other than the character of the user (hereinafter, referred to as a "user character") carrying out a predetermined action (hereinafter, referred to as a "photographing action") on the photographing screen when the photographing operation is carried out, the object (hereinafter, referred to as a "photographing subject") satisfying a predetermined condition; and a storing section configured to store at least a part of the photographing screen in a predetermined storage region on the basis of a storing operation.

According to still another non-limiting aspect of the present invention, there is provided a video game processing method of controlling progress of a video game in response to an operation of a user. The video game processing method according to one embodiment of the present invention includes: an updating process configured to update a position of a character on a virtual space on the basis of a moving operation by one user or a plurality of users, the one user or each of the plurality of users being capable of operating the character; a first displaying process configured to display a game screen (hereinafter, referred to as a "normal screen") corresponding to the one user or each of the plurality of users on the basis of an update result by the updating process; a second displaying process configured to display a game screen (hereinafter, referred to as a "photographing screen") on the basis of a photographing operation, an object other than the character of the user (hereinafter, referred to as a "user character") carrying out a predetermined action (hereinafter, referred to as a "photographing action") on the photographing screen when the photographing operation is carried out, the object (hereinafter, referred to as a "photographing subject") satisfying a predetermined condition; and a storing process configured to store at least apart of the photographing screen in a predetermined storage region on the basis of a storing operation.

According to each of the embodiments of the present application, one or two or more shortages are solved.

BRIEF DESCRIPTION OF THE DRAWINGS

The foregoing and other objects, features and advantages of the present invention will become more readily apparent from the following detailed description of preferred embodiments of the present invention that proceeds with reference to the appending drawings.

DETAILED DESCRIPTION OF THE INVENTION

Hereinafter, examples of embodiments according to the present invention will be described with reference to the drawings. In this regard, various kinds of elements in an example of each embodiment, which will be described below, can appropriately be combined with each other in a range where contradiction or the like does not occur. Further, explanation of the content that will be described as an example of an embodiment may be omitted in another embodiment. Further, the content of operations and/or processing with no relationship to characteristic portions of each embodiment may be omitted. Moreover, various kinds of processing that constitute various kinds of processing flows (will be described below) may be carried out in random order in a range where contradiction or the like does not occur in the content of the processing.

First Embodiment

Figure 1:
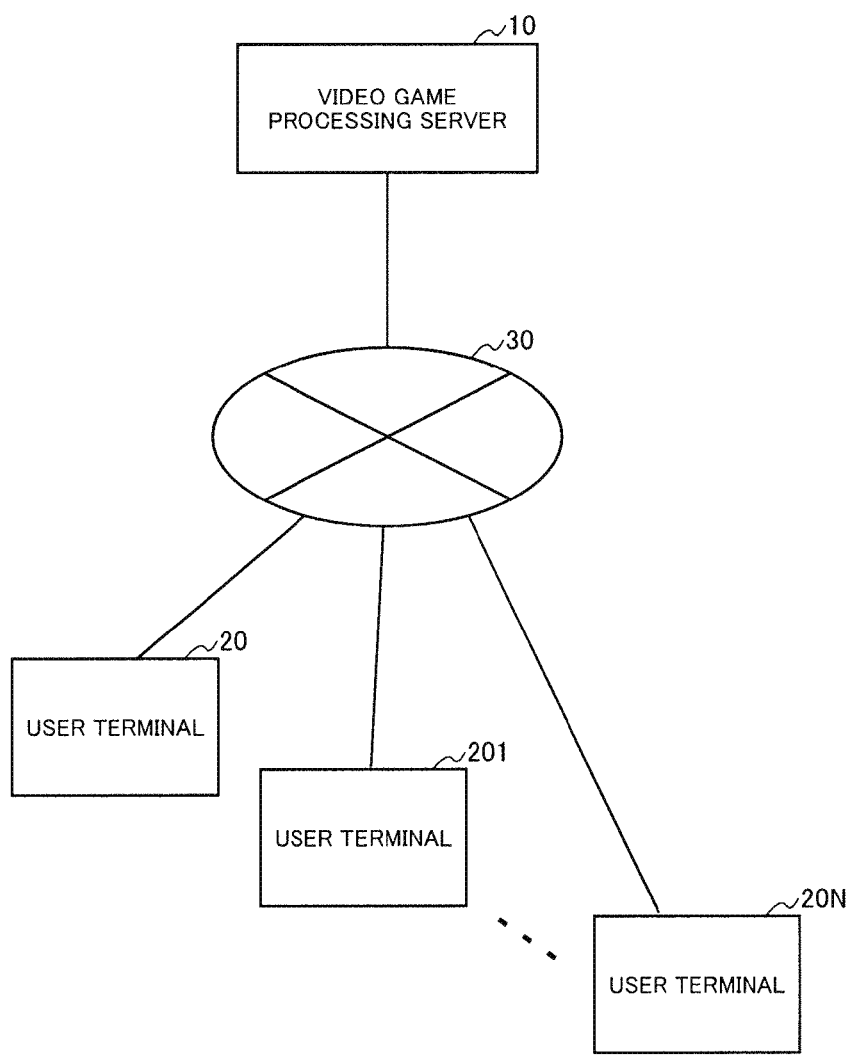
FIG. 1 is a block diagram showing an example of a configuration of a video game processing system corresponding to at least one of embodiments according to the present invention.

FIG. 1 is a block diagram showing an example of a configuration of a video game processing system 100 according to one embodiment of the present invention. As shown in FIG. 1, the video game processing system 100 includes a video game processing server 10, and user terminals 20 and 201 to 20N ("N" is an arbitrary integer) respectively used by a plurality of users (players) who play a video game. In this regard, the configuration of the video game processing system 100 is not limited to this configuration. The video game processing system 100 may be configured so that the plurality of users uses a single user terminal, or may be configured so as to include a plurality of servers.

Each of the video game processing server 10 and the plurality of user terminals 20 and 201 to 20N is connected to a communication network 30 such as the Internet. In this regard, although it is not shown in the drawings, the plurality of user terminals 20 and 201 to 20N is connected to the communication network 30 by carrying out data communication with base stations managed by a telecommunication carrier by means of a radio communication line.

The video game processing system 100 includes the video game processing server 10 and the plurality of user terminals 20, 201 to 20N, whereby various kinds of functions for controlling progress of the video game in response to an operation of the user are realized.

The video game processing server 10 is managed by an administrator of the video game processing system 100, and has various kinds of functions to provide information regarding the video game to the plurality of user terminals 20, 201 to 20N. In the present embodiment, the video game processing server 10 is constructed by an information processing apparatus, such as a WWW server, and includes a storage medium for storing various kinds of information. In this regard, the video game processing server 10 is provided with a general configuration for carrying out the video game, such as a control section and a communicating section. However, its explanation herein is omitted. Further, in the video game processing system 100, it is preferable that the video game processing server 10 manages information regarding the video game from a point of view to reduce a processing load on each of the plurality of user terminals 20,

201 to 20N. However, the storage section for storing the various kinds of information may include a storage region with a state that the video game processing server 10 can access the storage region. For example, the video game processing server 10 may be configured so as to be provided with a dedicated storage region outside the video game processing server 10.

Figure 2:
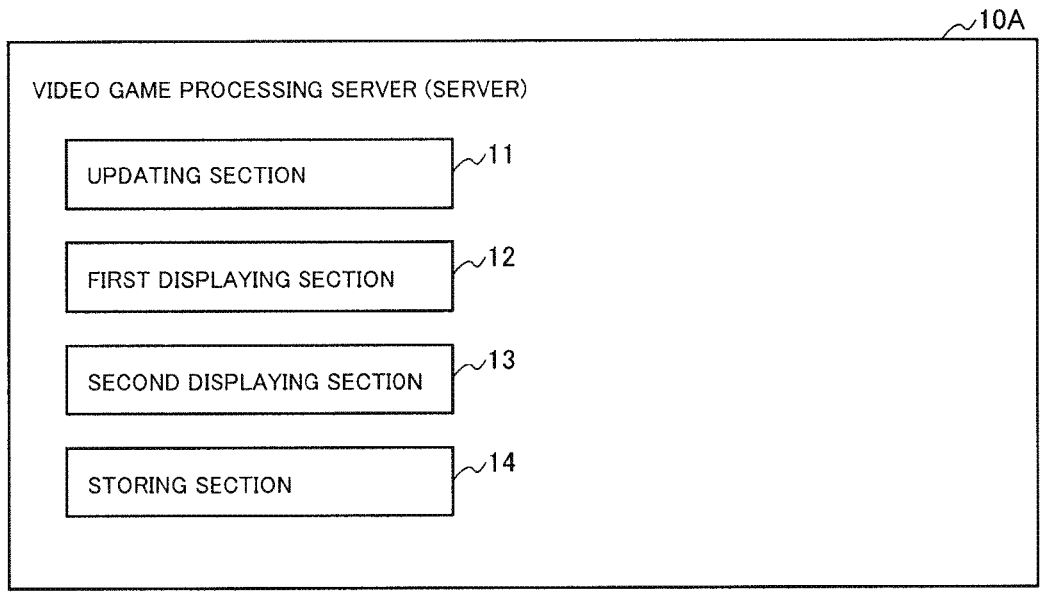
FIG. 2 is a block diagram showing a configuration of a video game processing server corresponding to at least one of the embodiments according to the present invention.

FIG. 2 is a block diagram showing a configuration of a video game processing server 10A (hereinafter, referred to as a "server 10A") that is an example of the configuration of the video game processing server 10. The server 10A at least includes an updating section 11, a first displaying section 12, a second displaying section 13, and a storing section 14.

The updating section 11 has a function to update a position of a character that one user or each of a plurality of users can operate on the virtual space on the basis of an operation of each of the users.

Here, the word "character that the user can operate" means a character that acts on the basis of an operation input by the user (a so-called player character). Namely, it is preferable that the video game whose progress is controlled by the video game processing server 10 is a video game in which the user is allowed to operate a character. In this regard, there may be a case where the user character is not displayed on a game screen.

Further, the position on the virtual space means a space in which components of the video game including the character are virtually arranged. In this regard, the virtual space may be shared by the plurality of users, or may not be shared by the plurality of users. In this regard, in a case where the virtual space is shared, that is, in a case where the video game is a video game for multiplayer, a character of the other user may be contained in an "operation subject" (will be described later).

Further, the word "update the position of the character on the virtual space on the basis of the user operation" means that information regarding the position of the character (hereinafter, referred to as "position related information") is updated using information regarding the user operation (that is, operation related information). In this regard, the configuration to update the position related information is not limited particularly. For example, the video game processing system 100 may be configured so that the position related information is managed by the video game processing server 10, or the position related information is managed by the user terminal 20, 201 to 20N. As an example of such a configuration, there is a configuration in which a server obtains user information inputted in each of the user terminals, the server carries out processing necessary to manage the virtual space, and information regarding an execution result is transmitted to each of the user terminals. In this case, as examples of the processing necessary to manage the virtual space, various kinds of processes, such as arrangement of time series, determination of a valid operation or an invalid operation, update of the character information, and the like may be contained. Further, as examples of the information regarding the execution result, various kinds of information such as updated positional information, generated image information, and the like can be contained.

The first displaying section 12 has a function to cause the user terminal operated by each of the users to display a game screen corresponding to each of the users (hereinafter, referred to as a "normal screen") on the basis of an update result by the updating function.

Here, the user terminal means a terminal operated by one user in principle and a terminal that causes a display device provided therein to display (or output) a game screen on a screen of the display device.

Further, the word "the server causes the user terminal (client) to display a game screen" means that communication for causing the user terminal to display the game screen is carried out. In this regard, the information transmitted by the server is not limited particularly. The video game processing system 100 may be configured so that the information contains image information. Alternatively, the video game processing system 100 may be configured so that the information contains only a command for the user terminal.

The second displaying section 13 has a function to display a game screen (that is, a screen for photographing; hereinafter referred to as a "photographing screen") on the user terminal operated by the user who carried out the photographing operation. On the photographing screen, an object (hereinafter, referred to as a "photographing subject") other than the character of the user (the user character) that satisfies a predetermined condition when the photographing operation was carried out carries out a predetermined action (hereinafter, referred to as a "photographing action").

Here, the photographing operation means an input corresponding to a command to display the photographing screen. Namely, in the present embodiment, storage of the game screen (acquisition of a screenshot) is carried out by the photographing operation (that is, a first operation) and a storing operation (that is, a second operation, will be described later). Namely, the photographing operation according to the present embodiment means an operation for entering a preparatory phase to photograph a screenshot. The configuration that the server 10A receives a photographing operation by the user is not limited particularly. However, it is preferable that the configuration is a configuration in which the user easily inputs such an operation via a controller.

Further, the object means one that constitutes the virtual space including various kinds of characters (the so-called player character and a non-player character). A condition to become the photographing subject is not limited particularly. However, it is preferable that the content of the condition can be recognized by the user.

Further, the photographing action means an action defined in advance, which is carried out by the object. The content of the photographing action is not limited particularly. However, it is preferable to be a position of the object when there is a photographing operation or a position that is determined on the basis of the position. As an example of the position that is determined on the basis of the position, there is a position on the virtual space that is determined on the basis of a predetermined rule or a user operation. In this regard, the configuration for specifying an action corresponding to an object is not limited particularly. The video game processing system 100 may be configured so that the position is determined at the time of creation of the video game. Alternatively, the video game processing system 100 may be configured so that the position is determined in accordance with a status of the video game. Further, the video game processing system 100 may be configured so that the position of the object may be changed in response to the user operation or photographing action received while displaying the photographing screen. In this case, it is preferable that a position change (or reposition) of the object by means of a user operation or the like does not affect on the position managed by the server. Namely, it is preferable that a position change (or reposition) of the object (except for a character of a photographer) on the photographing screen does not affect on positional information managed for the normal screen.

Further, the photographing screen means a screen that is ready to be stored in response to an operation of the user. In this regard, it is no need to correspond the photographing screen with the screen (the so-called screenshot) that is to be photographed actually. For example, the video game processing system 100 may be configured so that a part of the photographing screen becomes a screen thus photographed (hereinafter, referred to as a "photographed screen").

The storing section 14 has a function to store at least a part of the photographing screen in a predetermined storage region on the basis of the storing operation.

Here, the storing operation means an input corresponding to a command to store a game screen. The configuration that the server 10A receives the storing operation by the user is not limited particularly. However, it is preferable that the storing operation is carried out while displaying the photographing screen. As an example of the storing operation, there is an operation to press a key different from the photographing operation. In this regard, the video game processing system 100 may be configured so that it is determined that the storing operation is received in a case where an operation the same as the photographing operation is received while displaying the photographing screen.

Further, the predetermined storage region may be provided in the inside of the server 10A, or may be provided on the outside of the server 10A. Further, the configuration to store all or a part of the photographing screen (that is, the photographed screen) is not limited particularly. However, it is preferable that the configuration is a configuration in which the user who took a photograph is allowed to arbitrarily access the photographed screen thus stored. As an example of the configuration to store the photographed screen, there is a configuration to store identification information of the user and screen information so as to be associated with each other.

Each of the plurality of user terminals 20, 201 to 20N is managed by a user (or a player) who plays the video game, and is configured by a communication terminal, such as a cellular phone terminal, a PDA (Personal Digital Assistants), and a mobile game device, by which the user can play a network delivery type game, for example. In this regard, the configuration of the user terminal that the video game processing system 100 can include is not limited to the examples described above. However, the user terminal may be configured so that the user can recognize the video game. As the other example of the configuration of the user terminal, there is a so-called wearable divide such as a smart watch, a combination of the wearable device and the communication terminal, and the like.

Further, each of the plurality of user terminals 20, 201 to 20N is connected to the communication network 30, and includes hardware (for example, the display device for displaying a game screen, an audio output device and the like) and software for carrying out the video game by communicating with the video game processing server 10. In this regard, each of the plurality of user terminals 20, 201 to 20N may be configured so as to be capable of directly communicating with each other without the video game processing server 10.

Next, an operation of a video game processing system 100 (hereinafter, referred to as "system 100") according to the present embodiment will be described.

Figure 3:
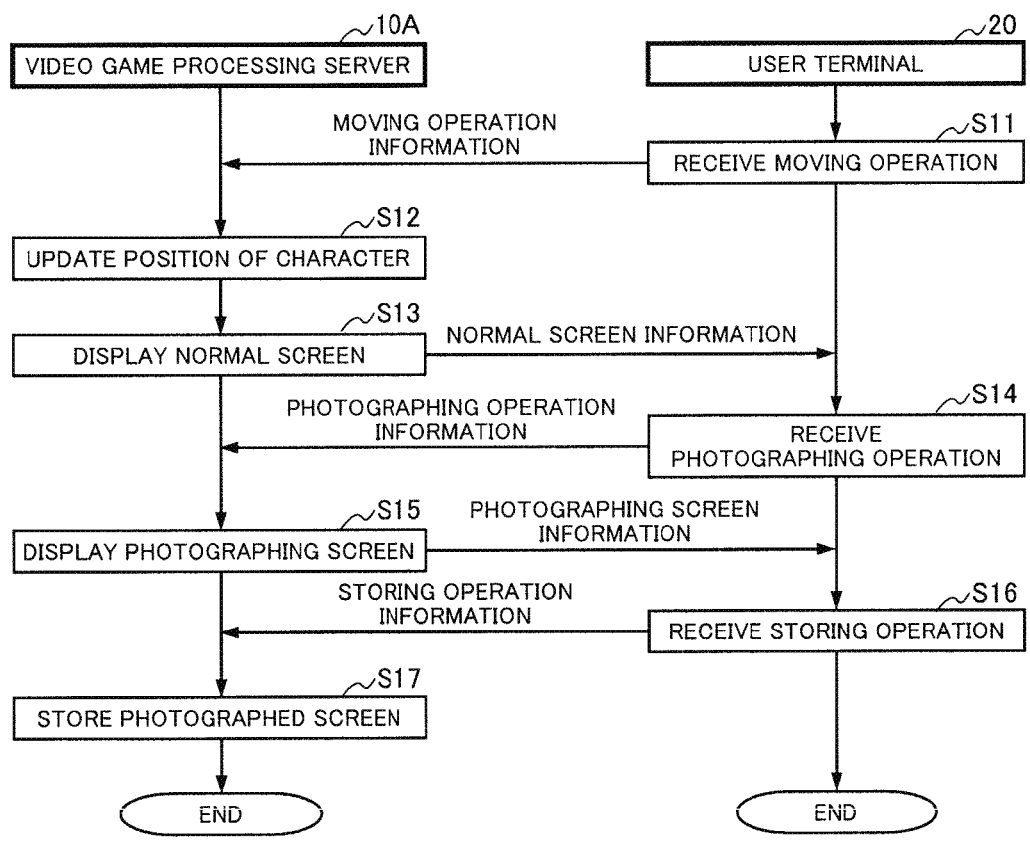
FIG. 3 is a flowchart showing an example of game processing corresponding to at least one of the embodiments according to the present invention.

FIG. 3 is a flowchart showing an example of game processing carried out by the system 100. In the game processing according to the present embodiment, processing related to registration of a group of elements and usage of the group of elements is carried out. Hereinafter, a case where the server 10A and a user terminal 20 (hereinafter, also referred to as "terminal 20") carry out the game processing as processing related to the video game will be described as an example.

The game processing is started when it is in a state in which photographing is allowed, for example. Hereinafter, a case where photographing is permitted in the terminal 20 will be described as an example.

In the game processing, the terminal 20 first receives a photographing operation (Step S11). In the present embodiment, the terminal 20 receives an operation via the controller as a moving operation, and transmits information regarding the received moving operation (moving operation information) to the server 10A. In this regard, the configuration of the controller is not limited particularly. The controller may be a game pad or a keyboard. Alternatively, the controller may be a so-called virtual controller.

When the moving operation information is received from the terminal 20, the server 10A updates the position of the character on the basis of the received moving operation information (Step S12). In the present embodiment, the server 10A updates coordinates of the character in the virtual space in which the plurality of characters are arranged.

When the position of the character is updated, the server 10A causes the terminal 20 to display the normal screen (Step S13). In the present embodiment, the server 10A transmits information, which contains the position of the character after update, (hereinafter, referred to as "normal screen information") to the terminal 20.

When the normal screen information is received from the server 10A, the terminal 20 receives a photographing operation (Step S14). In the present embodiment, the terminal 20 displays the normal screen on the basis of the received normal screen information; receives a predetermined photographing operation by the user; and transmits information regarding the photographing operation (hereinafter, referred to as "photographing operation information") to the server 10A.

When the photographing operation information is received from the terminal 20, the server 10A displays the photographing screen on the basis of the received photographing operation information (Step S15). In the present embodiment, the server 10A transmits information containing the information regarding the photographing subject (hereinafter, referred to as "photographing screen information") to the terminal 20.

When the photographing screen information is received from the server 10A, the terminal 20 receives a storing operation (Step S16). In the present embodiment, the terminal 20 displays the photographing screen on the basis of the received photographing screen information; receives a predetermined storing operation by the user; and transmits information regarding the storing operation (hereinafter, referred to as "storing operation information") to the server 10A.

When the storing operation information is received from the terminal 20, the server 10A stores all or a part of the photographing screen (hereinafter, referred to as a "photographed screen") on the basis of the received storing operation information (Step S15). In the present embodiment, the server 10A store the photographed screen in a predetermined storage region so as to be associated with the identification information of the terminal 20.

Figure 4:
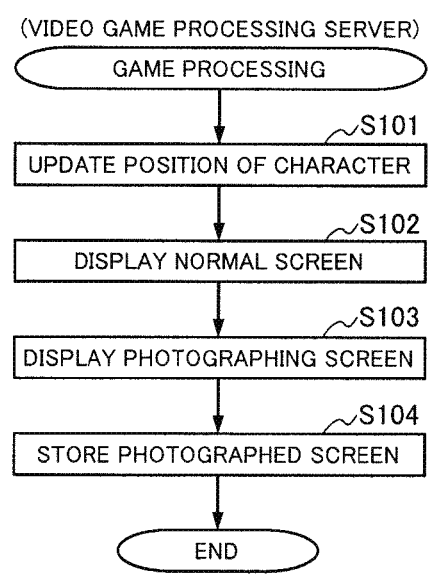
FIG. 4 is a flowchart showing an example of an operation of a server side in game processing corresponding to at least one of embodiments according to the present invention.

FIG. 4 is a flowchart showing an example of an operation of the server 10A side in the game processing. Here, the operation of the server 10A in the video game processing system 100 will be described again.

In the game processing, the server 10A first updates a position of the character (Step S101); displays the normal screen (Step S102); displays the photographing screen (Step S103); and stores all or a part of the photographing screen (the photographed screen) (Step S104).

Figure 5:
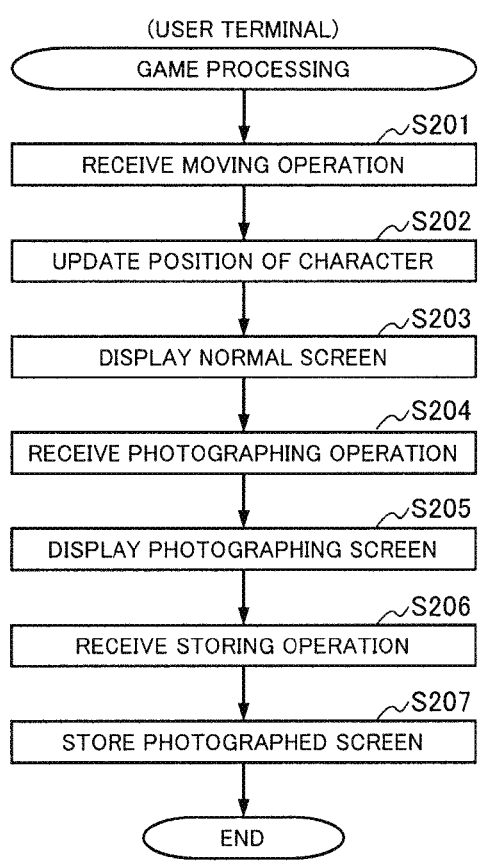
FIG. 5 is a flowchart showing an example of an operation of a terminal side in the game processing corresponding to at least one of the embodiments according to the present invention.

FIG. 5 is a flowchart showing an example of the action of the terminal 20 side in a case where the terminal 20 carries out the game processing. Hereinafter, a case where the terminal 20 solely carries out the game processing will be described as an example. In this regard, the terminal 20 is configured so as to include the similar functions of the video game processing server 10 except for the function to receive the various kinds of information from the video game processing server 10. Thus, its explanation is omitted from a point of view to avoid repeated explanation.

The terminal 20 receives a moving operation by one user or a plurality of users who operates the terminal 20 (Step S201). In the present embodiment, the terminal 20 receives a predetermined user operation indicating a moving direction as a moving operation.

When the moving operation is received, the terminal 20 updates a position of the character, which each of the users can operate, on the virtual space on the basis of the received moving operation (Step S202). In the present embodiment, the terminal 20 controls progress of the video game that proceeds using the virtual space in which various kinds of objects including a character operated by one user are arranged. In this regard, explanation of update other than that of the position of the character (for example, update of various kinds of parameters) will be omitted herein.

When the position of the character is updated, the terminal 20 displays a game screen (the normal screen) corresponding to each of the users on the basis of an update result (Step S203). In the present embodiment, the terminal 20 displays a game screen corresponding to a camera that virtually photographs the character operated by the one user (hereinafter, referred to as a "virtual camera") on a display screen of the display device provided therein.

When the normal screen is displayed (or is being displayed), the terminal 20 receives a photographing operation (Step S204). In the present embodiment, the terminal 20 determines that the photographing operation is received in a case where a predetermined button provided on the controller is pressed.

When the photographing operation is received, the terminal 20 displays the photographing screen (Step S205). In the present embodiment, the terminal 20 displays, on the basis of the photographing operation, the photographing screen in which the object (the photographing subject) other than the character of the user who operates the terminal 20 that satisfies the predetermined condition when the photographing operation was carried out carries out the predetermined action (photographing action) at the position as the game screen When the photographing screen is displayed (or is being displayed), the terminal 20 receives a storing operation (Step S206). In the present embodiment, the terminal 20 determines that the storing operation is received in a case where a predetermined operation that does not contain specification of a photographing range is received.

When the storing operation is received, the terminal 20 stores the photographed screen (Step S207). In the present embodiment, the terminal 20 stores at least a part (the photographed screen) of the photographing screen in a predetermined storage region on the basis of the storing operation.

As explained above, as one side of the first embodiment, the video game processing server 10A for controlling progress of the video game in response to an operation of the user is configured so as to include the updating section 11, the first displaying section 12, the second displaying section 13, and the storing section 14. Thus, it is possible to: update the position of each of the characters that the users can operate on the virtual space on the basis of the moving operation one user or the plurality of users; cause the user terminal operated by each of the users to display the game screen (the normal screen) corresponding to each of the users on the basis of the update result by the updating function; cause the user terminal operated by the user who carried out the photographing operation to display the game screen (the photographing screen) in which the object (the photographing subject) other than the character of the user (the user character), which satisfies the predetermined condition when the photographing operation was carried out, carries out the predetermined action (the photographing action); and store at least a part of the photographing screen in the predetermined storage region on the basis of the storing operation. Therefore, it is possible to provide the user with the video game in which it is easy to obtain an intended screenshot.

Namely, the photographing operation causes the terminal 20 to display the game screen in which other object that the user cannot operate in principal carries out the predetermined action. Therefore, it is possible to reduce a difficulty to obtain the photographed screen intended by the user.

Further, as one side of the first embodiment described above, the video game processing system 100 is configured so that the photographing subject includes a character that acts in accordance with a character of other user than the user who carried out the photographing operation or predetermined rule. Therefore, it is possible to reduce a difficulty to obtain the photographed screen including various kinds of characters compared with a case where various kinds of characters act independently of an intention of the user who wants to take a photograph.

Further, as one side of the first embodiment described above, the video game processing system 100 is configured so that the photographing action is an action that is carried out at a position at which the photographing subject is positioned when the photographing operation was carried out or a position determined on the basis of the position. Therefore, it becomes possible to shift (or change) from the normal screen to the photographing screen smoothly.

In this regard, it has not been mentioned particularly in the example of the first embodiment described above. However, the server 10A causes the user terminal 20 operated by the user who does not carry out a photographing operation to display the normal screen. Namely, in the plurality of user terminals each of which displays the normal screen, the game screen showing that various kinds of objects exist in the same virtual space is displayed. However, in the user terminal that displays the photographing screen, an original game screen for photographing is displayed. In this regard, it is preferable that the latest normal screen is displayed in the user terminal after the photograph is terminated.

Second Embodiment

Figure 6:
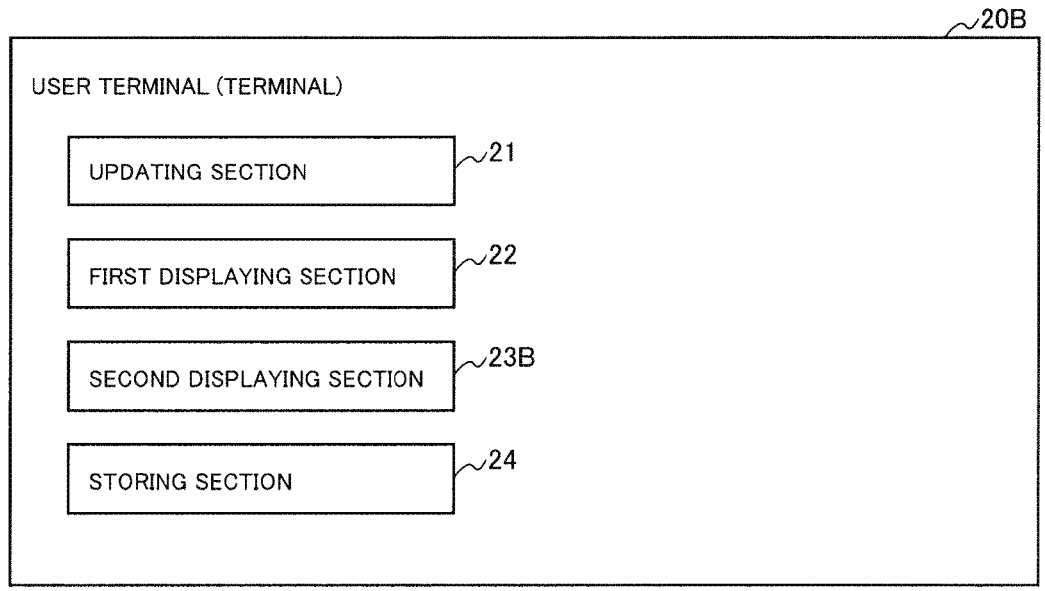
FIG. 6 is a block diagram showing a configuration of a user terminal corresponding to at least one of the embodiments according to the present invention.

FIG. 6 is a block diagram showing a configuration of a user terminal 20B (hereinafter, referred to as a "terminal 20B"), which is an example of the user terminal 20. In the present embodiment, the terminal 20B at least includes an updating section 21, a first displaying section 22, a second displaying section 23B, and a storing section 24.

The updating section 21 has a function to update a position of a character that one user or each of a plurality of users the user can operate on a virtual space on the basis of a moving operation by each of the users.

The first displaying section 22 has a function to display a game screen (hereinafter, referred to as a "normal screen") corresponding to each of the users on the basis of an update result by the updating section 21.

The second displaying section 23B has a function to display, on the basis of a photographing operation, a game screen (hereinafter, referred to as a "photographing screen") in which an object (hereinafter, referred to as a "photographing subject") other than the character of the user (the user character) that satisfies a predetermined condition when the photographing operation was carried out carries out a predetermined action (that is, a photographing action).

Further, the second displaying section 23B also has a function to display a photographing screen in which an eye of the photographing subject faces toward (or looks at) a position of a virtual camera.

Here, the configuration to cause the eye of the photographing subject to face the position of the virtual camera is not limited particularly. However, it is preferable that the photographing screen does not give an uncomfortable feeling to the user. Namely, for example, it is preferable that the configuration is a configuration in which a portion constituting the object other than the "eye" is also adjusted appropriately in accordance with the position of the virtual camera. As an example of such a configuration, there is a configuration in which not only an eye of an object but also the whole object is controlled to face toward a position of the virtual camera. In this regard, in the present embodiment, a case where "an eye faces toward a position of a camera" is referred to as a "camera eye line", and a case where "a substantial front surface, not the camera, faces toward the position of the camera" is referred to as a "state where the object faces toward the position of the camera".

The storing section 24 has a function to store at least a part of the photographing screen in a predetermined storage region on the basis of a storing operation.

Figure 7:
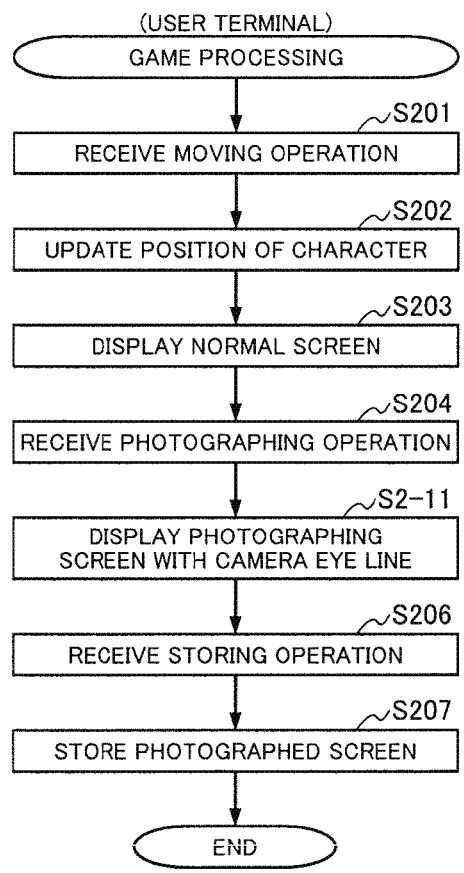
FIG. 7 is a flowchart showing an example of the game processing corresponding to at least one of the embodiments according to the present invention.

FIG. 7 is a flowchart showing an example of the game processing carried out by the terminal 20. Hereinafter, an operation of the terminal 20B will be described as an example. In this regard, an operation with the video game processing server 10 is omitted from a point of view to avoid repeated explanation.

When the photographing operation is received, the terminal 20B displays a photographing screen of a camera's eye (Step S2-11). In the present embodiment, the terminal 20B controls an object that satisfies the predetermined condition so that an eye of the object faces toward the virtual camera as object that does not depend on a control for the normal screen.

As explained above, as one side of the second embodiment, the user terminal 20B is configured so as to include the updating section 21, the first displaying section 22, the second displaying section 23B, and the storing section 24. Therefore, it is possible to provide the user with the video game by which the photographing screen, in which an eye of the photographing subject faces toward the position of the virtual camera, is displayed and this makes it possible for the user to experience a feeling to photograph a commemorative picture together with the photographing subject.

In this regard, as the example of the second embodiment described above, the case where the terminal 20B displays the photographing screen in which the eye of the photographing subject faces toward the position of the virtual camera has been explained as an example. However, the configuration of the photographing screen is not limited to this configuration. The video game processing system 100 may be configured so that the object is controlled so as to comply with an intention of a photographer. As an example of such a configuration, there is a configuration in which an eye line not only faces toward a direction of a camera, but also faces a predetermined direction defined in advance. Since there is a person who his or her gaze from the camera when to take a picture, such a configuration may be useful.

Third Embodiment

Figure 8:
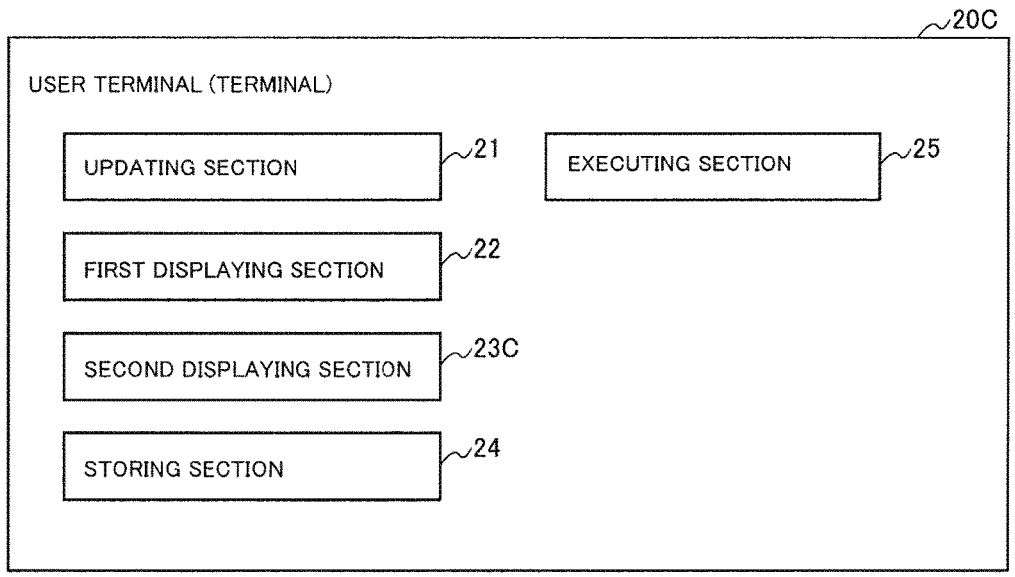
FIG. 8 is a block diagram showing a configuration of the user terminal corresponding to at least one of the embodiments according to the present invention.

FIG. 8 is a block diagram showing a configuration of a user terminal 20C (hereinafter, referred to as a "terminal 200"), which is an example of the user terminal 20. In the present embodiment, the terminal 20C at least includes an updating section 21, a first displaying section 22, a second displaying section 23C, a storing section 24, and an executing section 25.

The executing section 25 has a function to cause the user character to carry out (or execute) a series of actions.

Here, the series of actions means actions that are carried out when the user inputs an execution starting operation therefor. The configuration of the series of actions is not limited particularly. However, it is preferable that the series of actions include one expressing user's feelings. As examples of the series of actions, there are an "action to make a bow" associated with an operation indicating "greeting", and an "action to sit down in that place and then to lie down" associated with an operation indicating "having a rest".

The second displaying section 23C has a function to display a photographing screen in which the series of actions that are defined in advance as at least a part of the photographing action are carried out.

Figure 9:
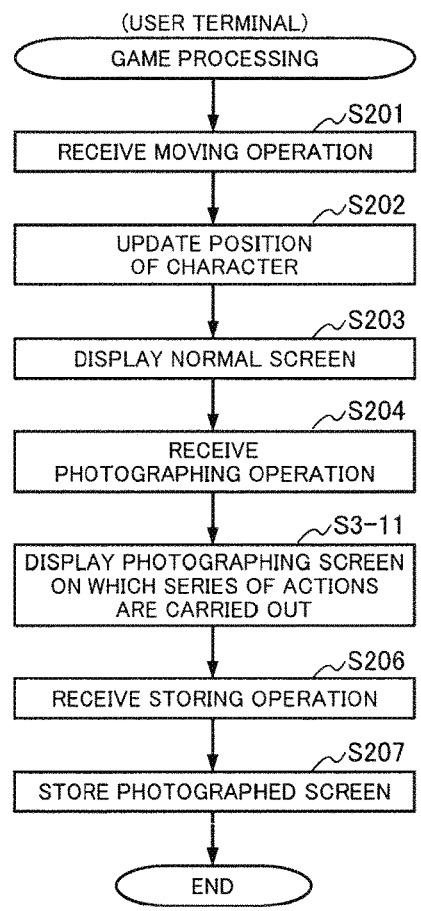
FIG. 9 is a flowchart showing an example of the game processing corresponding to at least one of the embodiments according to the present invention.

FIG. 9 is a flowchart showing an example of game processing carried out by the terminal 20. Hereinafter, an operation of the terminal 200 will be described as an example. In this regard, an operation with the video game processing server 10 is omitted from a point of view to avoid repeated explanation.

When a photographing operation is received, the terminal 20C displays a photographing screen in which the series of actions are carried out (Step S3-11). In the present embodiment, the terminal 20C displays, as the photographing screen, a game screen in which the object displayed on a display screen of the terminal 20C carries out the series of actions.

As explained above, as one side of the third embodiment, the user terminal 20C is configured so as to include the updating section 21, the first displaying section 22, the second displaying section 23C, the storing section 24, and the executing section 25. Thus, it is possible to cause the user character to: carry out the series of actions; and display the photographing screen in which the series of actions defined in advance as at least a part of the photographing action is carried out. Therefore, it is possible to provide a user with the video game in which it is further easy for the user to obtain an intended screenshot compared with a case where the user cannot predict an action of an object.

Fourth Embodiment

Figure 10:
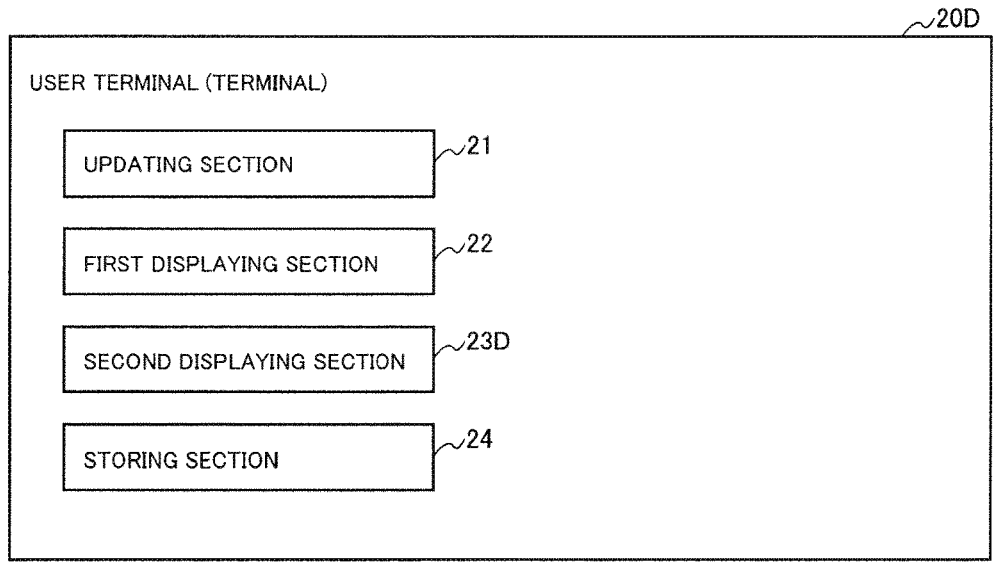
FIG. 10 is a block diagram showing a configuration of the user terminal corresponding to at least one of the embodiments according to the present invention.

FIG. 10 is a block diagram showing a configuration of a user terminal 20D (hereinafter, referred to as a "terminal 20D"), which is an example of the user terminal 20. In the present embodiment, the terminal 20D at least includes an updating section 21, a first displaying section 22, a second displaying section 23D, and a storing section 24.

The second displaying section 23D has a function to display a photographing screen in which each of a plurality of user characters starts a series of actions as the photographing action at predetermined timing in a case where the plurality of user characters is a photographing subject.

Here, as the plurality of user characters, there are a case where a plurality of characters of the user who operates the terminal 20D is included and a case where a character of other user than the user is included. In this regard, the configuration to display the character of other user on the display screen of the display device included in the terminal 20D is not limited particularly. However, it is preferable that the video game processing system 100 is configured so that the users respectively operate different terminals. As examples of such a configuration, there are a client server system configuration and a P2P type configuration.

Further, the series of actions may be common to the plurality of user characters, or may not be common to the plurality of user characters. In a case where the series of actions are not common, a method of determining the series of actions corresponding to each of the user characters is not limited particularly. However, the video game processing system 100 may be configured so that the user of the terminal 20D is allowed to determine whether the series of actions is common or not. Alternatively, the video game processing system 100 may be configured so that it is determined whether the series of actions is common or not in accordance with a predetermined rule independently of an operation of the user, for example.

Further, the predetermined timing may be common to the plurality of user characters. The video game processing system 100 may be configured so that the predetermined timing is specified on the basis of a kind and/or a position of each of the user characters, or a kind of the series of actions. Namely, the video game processing system 100 maybe configured so that timing when the plurality of user characters included in the photographing subject starts the series of actions coincides with each other, or so that the timing does not coincide with each other. However, it is preferable to provide timing at which there is a high possibility that the user wants to store the game screen in the photographing screen. As an example of such a configuration, there is a configuration in which each of the actions starts at timing when the series of actions by the plurality of user characters are completed substantially at the same time.

Figure 11:
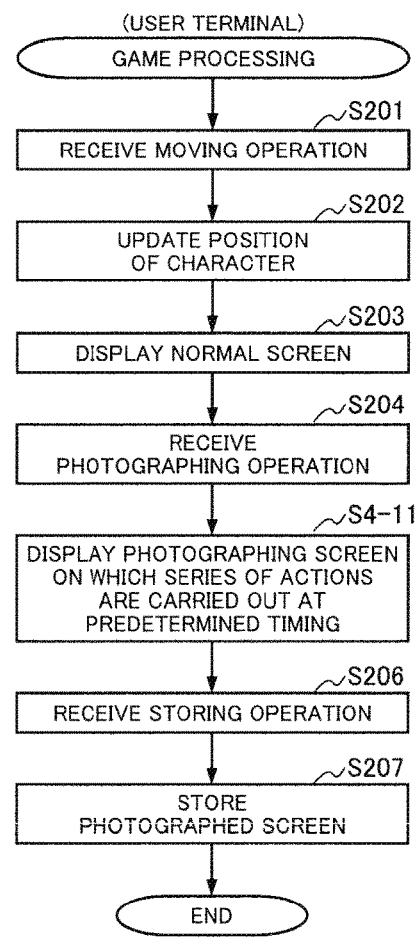
FIG. 11 is a flowchart showing an example of the game processing corresponding to at least one of the embodiments according to the present invention.

FIG. 11 is a flowchart showing an example of game processing carried out by the terminal 20. Hereinafter, an operation of the terminal 20D will be described as an example. In this regard, an operation with the video processing server is omitted from a point of view to avoid repeated explanation.

When a photographing operation is received, the terminal 20D displays the photographing screen in which a series of actions are carried out at predetermined timing (Step S4-11). In the present embodiment, the terminal 20D displays a game screen, in which the user character displayed on the display screen of the terminal 20D carries out the series of actions at the predetermined timing as the photographing screen.

As explained above, as one side of the fourth embodiment, the video game processing server 10D is configured so as to include the updating section 21, the first displaying section 22, the second displaying section 23D, and the storing section 24. Thus, in a case where the plurality of user characters are the photographing subjects, the photographing screen in which each of the user character starts the series of actions at predetermined timing as the photographing action is displayed. Therefore, it is possible to provide the user with the video game in which the intended screenshot can be obtained comparatively easily even when there is a plurality of user characters.

Fifth Embodiment

Figure 12:
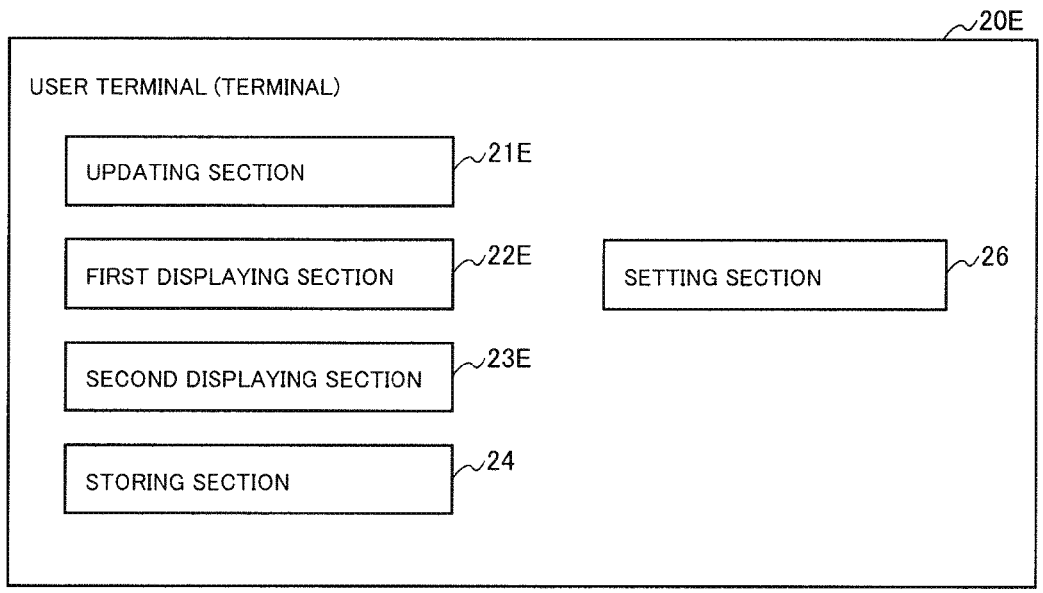
FIG. 12 is a block diagram showing a configuration of the user terminal corresponding to at least one of the embodiments according to the present invention.

FIG. 12 is a block diagram showing a configuration of a user terminal 20E (hereinafter, referred to as a "terminal 20E"), which is an example of the user terminal 20. In the present embodiment, the terminal 20E at least includes an updating section 21E, a first displaying section 22E, a second displaying section 23E, a storing section 24E, and a setting section 26E.

The updating section 21E has a function to update a position of each of user characters in a case where a photographing operation is carried out. Namely, information corresponding to a normal screen is updated even while displaying a photographing screen.

The first displaying section 22E has a function to display the normal screen on the user terminal operated by a user on the basis of the fact that the user who carried out the photographing operation satisfies a terminating condition.

Here, the content of the terminating condition is not limited particularly. However, it is preferable that the user can satisfy the termination condition arbitrarily. As an example of the terminating condition, there is a condition that a predetermined operation by the user is received.

The second displaying section 23E has a function to display a photographing screen in which at least a part of a series of actions is repeated as a photographing action.

Here, the configuration to repeat all or a part of the series of actions is not limited particularly. For example, the video game processing system 100 may be configured so as to require an operation of the user, or so as not to require the operation.

Further, the second displaying section 23E has a function to display a photographing screen, in which at least one of an eye and a body of a photographing subject faces toward a position of a virtual camera, on the basis of a kind of the series of actions.

Here, the configuration to determine a portion that faces toward the position of the virtual camera is not limited particularly. However, it is preferable that the configuration is a configuration in which an unnatural impression is not applied to the user. As an example of such a configuration, there is a configuration in which a kind of the series of actions and the portion that faces toward the position of the virtual camera are stored in advance so as to be associated with each other.

Further, the second displaying section 23E has a function to di splay a photographing screen in which the series of actions that have been carried out before the photographing operation are contained in the photographing action.

Here, the series of actions that have been carried out before the photographing operation means a series of actions (just-before actions) that an object (including the user character) carried out before the user of the terminal 20 carries out the photographing operation. As an example of the configuration to display the photographing screen in which the just-before actions are carried out, there is a configuration in which the series of actions that were carried out by the respective objects are stored as the just-before actions so as to be associated with the respective objects.

Further, the setting section 26E has a function to set up a form of a photographing subject or the content of a photographing action on the basis of an operation by the user who carried out the photographing operation.

Here, the configuration for setting up the content of the form of the photographing subject is not limited particularly. However, it is preferable that the video game processing system 100 is configured so that in a case where the photographing subject is a character that has an expression (or aspect), the user can arbitrarily select one from a plurality of expression, for example. Further, the configuration to set up the content of the photographing action is not limited particularly. However, it is preferable that the configuration is a configuration in which the user can arbitrarily select one among a plurality of actions.

Moreover, the second displaying section 23E has a function to cause the user terminal to display a photographing screen in which a character that is positioned within a range set up for the virtual camera corresponding to the user who carried out the photographing operation is contained in the photographing subject.

Here, a correspondent relationship between the virtual camera and the photographing range is not limited particularly. For example, the video game processing system 100 may be configured so that in a case where a plurality of virtual cameras are set up for one virtual space, the photographing range is set up for each of the virtual cameras.

Further, the second displaying section 23E has a function to cause the user terminal to display a photographing screen in which a user character of other user associated with the user who carried out the photographing operation is included in the photographing subject.

Here, the configuration to associate the user of the terminal 20E with the other user is not limited particularly. However, it is preferable that the configuration is a configuration in which the user is allowed to recognize the other user with each other. As an example of such a configuration, there is a configuration to constitute a so-called friend or a party.

Figure 13:
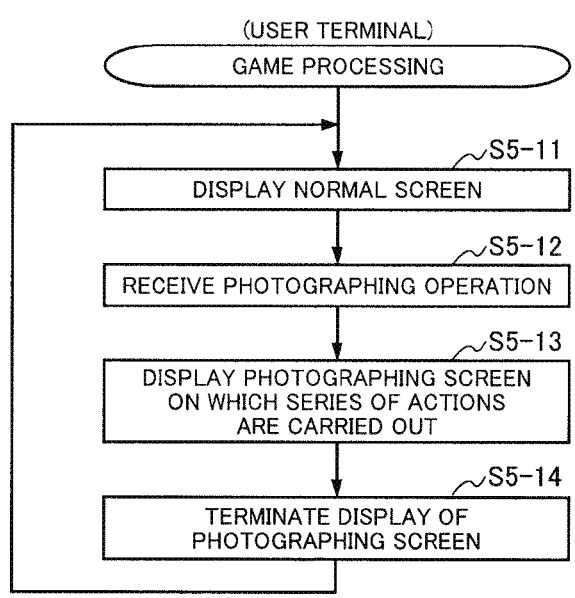
FIG. 13 is a flowchart showing an example of the game processing corresponding to at least one of the embodiments according to the present invention.

FIG. 13 is a flowchart showing an example of the game processing carried out by the terminal 20. Hereinafter, an operation of the terminal 20E will be described as an example. In this regard, an operation with the video game processing server 10 is omitted from a point of view to avoid repeated explanation.

When any photographing operation is not carried out, the terminal 20E displays the normal screen (Step S5-11). In the present embodiment, the terminal 20 displays screen on the basis of latest information of each of the objects that become photographing subjects after the photographing operation was carried out and the terminating condition is then satisfied.

When a photographing operation is received while displaying the normal screen (Step S5-12), the terminal 20E displays a photographing screen in which the series of actions by the photographing subject are carried out (Step S5-13). In the present embodiment, the terminal 20E specifies the photographing subject and the series of actions in accordance with progress of the video game, and displays the photographing screen.

When the photographing screen is displayed, the terminal 20E terminates the display of the photographing screen on the basis of the terminating condition (Step S5-14). In the present embodiment, the terminal 20E terminates the display of the photographing screen when a terminating operation by the user is received, and displays the latest normal screen.

As explained above, as one side of the fifth embodiment, the user terminal 20E is configured so as to include the updating section 21E and the first displaying section 22E. Therefore, even in a case where the photographing operation was carried out, it is possible to update the position of each of the user characters. Further, in a case where the user who carried out the photographing operation satisfies the terminating condition, it is possible to cause the user terminal operated by the user to display the normal screen (that is, the latest normal screen). This makes it possible to avoid an action of other user from being restricted by the photographing screen.

Further, as one side of the fifth embodiment, the user terminal 20E is configured so as to include the second displaying section 23E. Therefore, it is possible to display the photographing screen in which at least apart of the series of actions is repeated as the photographing action. This makes it possible to provide plural photographing timings suitable in the photographing screen.

Further, as one side of the fifth embodiment, the user terminal 20E is configured so as to include the second displaying section 23E. Therefore, the photographing screen in which at least one of the eye and the body of the photographing subject faces toward the position of the virtual camera is displayed on the basis of the kind of the series of actions. This makes it possible to reduce a user load for storing the game screen that may correspond to a so-called commemorative picture (that is, a game screen in which various kinds of objects looks to be aware of the camera eye line or the camera).

Further, as one side of the fifth embodiment, the user terminal 20E is configured so as to include the second displaying section 23E. Therefore, the photographing screen in which the series of actions carried out before the photographing operation are included in the photographing action can be displayed, and an object (that is, a restricted object) for which an action instruction of the user who carried out the photographing operation is restricted can be provided. Here, as examples of the restricted object, there are a part of non-player characters and a user character of other user. In this regard, the video game processing system 100 may be configured so that a behavior of the user character of the other user at the photographing operation can be set up in advance. Here, the settable matter is not limited particularly. However, for example, there are the content of the series of actions, whether the user who carried out the photographing operation is allowed or not, and the like.

Further, as one side of the fifth embodiment, the user terminal 20E is configured so as to include the second displaying section 23E. Therefore, the user terminal can be caused to display a photographing screen in which a character that is positioned within a range set up for the virtual camera corresponding to the user who carried out the photographing operation is included in the photographing subject. This makes it possible to realize a video game in which it is easy to store the game screen according to an intention of this user while a feeling to cut out "now (a present state)" of the game screen is applied to the user.

Further, as one side of the fifth embodiment, the user terminal 20E is configured so as to include the second displaying section 23E. Therefore, it is possible to provide, to the user, the video game in which the user terminal is caused to display the photographing screen, in which the user character of the other user associated with the user who carried out the photographing operation is included in the photographing subject; and the user who wants to take a photograph can obtain a screenshot conforming his or her intention without requesting it to other user between users in which a predetermined relationship is established, such as so-called party members.

Sixth Embodiment

Figures 14, 15:
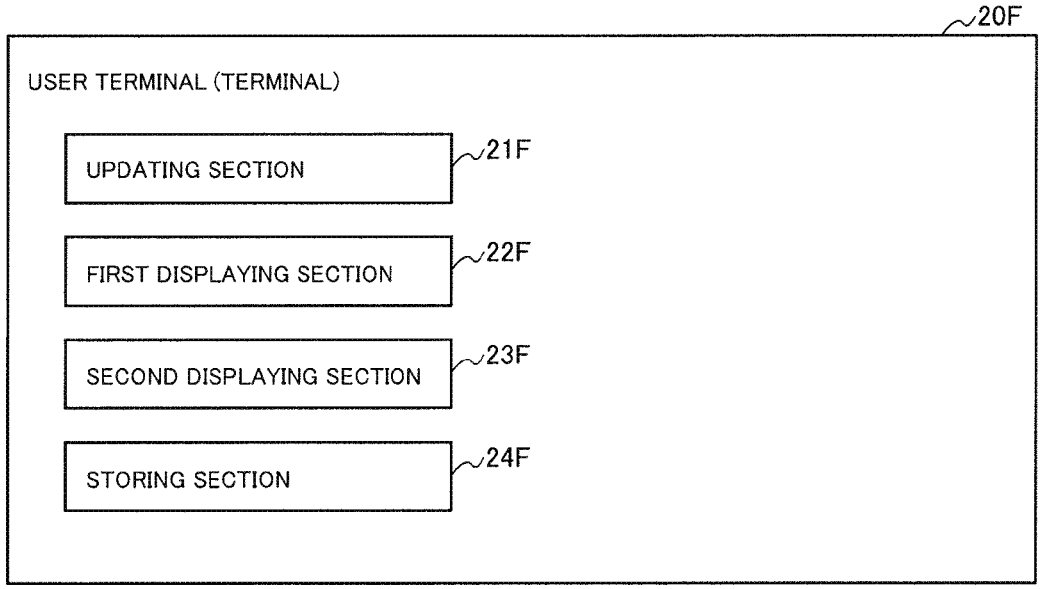
FIG. 14 is a block diagram showing a configuration of the user terminal corresponding to at least one of the embodiments according to the present invention.
FIG. 15 is an explanatory drawing for explaining an example of a storage state of information corresponding to at least one of the embodiments according to the present invention.

FIG. 14 is a block diagram showing a configuration of a user terminal 20F (hereinafter, referred to as a "terminal 20F"), which is an example of the user terminal 20 in the video game processing system 100 (see FIG. 1). Hereinafter, a case where progress of a video game (a so-called network game) that is caused to proceed by appropriately communicating with a video game processing server 10 is controlled by the terminal 20F provided with a display device will be described as an example.

In the present embodiment, the terminal 20F at least includes an updating section 21F, a first displaying section 22F, a second displaying section 23F, and a storing section 24F.

The updating section 21F has a function to update a position of a character that one user or each of a plurality of users can operate on a virtual space on the basis of an operation of each of the users. In the present embodiment, the updating section 21F communicates with the video game processing server 10 to carry out update of various kinds of information necessary for displaying a game screen.

The first displaying section 22F has a function to display a game screen (the normal screen) corresponding to each of the users on the basis of an update result by the updating function. In the present embodiment, the first displaying section 22F displays a game screen corresponding to a virtual viewpoint for the user who operates the terminal 20F. Namely, a game screen corresponding to a present state of a character that acts on the basis of an operation of other user (other user character) and a character that acts on the basis of a predetermined rule (non-player character) is displayed on the normal screen.

The second displaying section 23F has a function to display a game screen (the photographing screen), in which an object (photographing subject) other than the character of this user (the user character) that satisfies the predetermined condition when the photographing operation was carried out carried out a predetermined action (photographing action) at the position, on the basis of a photographing operation (or photograph starting operation) by the user. In the present embodiment, the second displaying section 23F sets up the terminal 20F to a photographing mode, in which update of the position is not reflected to at least a part of the other user character and the object in the virtual space, in a case where a predetermined photographing operation by the user is received.

Here, the configuration of the photographing mode is not particularly limited so long as the configuration is a configuration in which a position of at least a part of the objects is not updated unlike the normal screen. Hereinafter, a configuration in which a character of other user who forms a party with the user who carried out the photographing operation carries out a photographing action (hereinafter, referred to as a "group posing mode") will be described as an example.

FIG. 15 is an explanatory drawing for explaining an example of a storage state of information stored in a storage section (not shown in the drawings) included in the terminal 20F. As shown in FIG. 15, the terminal 20F stores a subject, a kind, and necessity of various kinds of functions related to the photographing screen as information regarding display of the photographing screen (that is, photographing screen related information) so as to be associated with each other.

Here, the subject means a controlled subject in the group posing mode. Namely, in the group posing mode, an action of the subject is controlled independently of that for the normal screen.

Further, the kind means a kind of the subject. By storing the kinds, it is possible to classify the control content in the group posing mode for every kind. As the kind according to the present embodiment, there are a PC operated by the user, and an NPC operated by a predetermined rule.

Further, as examples of the various kinds of functions, there are storage of coordinates in the virtual space, storage of a direction toward which the subject faces, execution of the camera eye line, and execution of an action for expressing emotion (hereinafter, referred to as an "emote" or "emoting"). In the present embodiment, the subject of various kinds of functions is set up to "1", and the other is set up to "0".

Here, the storage of coordinates means a function to store and develop current coordinates of a subject PC/NPC at the time when the group posing mode is carried out. In this regard, in the present embodiment, sky also becomes a subject in a case where the subject is flying. Further, in a case where the subject is falling down, coordinates of a ground plane is stored.

Further, the storage of the direction toward which the subject faces means a function to store and develop a direction toward which the subject PC/NPC currently faces at the time when the group posing mode is carried out.

Further, the execution of the camera eye line means a function that a PC/NPC as the subject carrying out a camera eye line carries out the camera eye line after the group posing mode transition. In this regard, in the present embodiment, the camera eye line is carried out when a fixed time elapses after transition of the group posing mode.

Further, in the present embodiment, the eye line does not always follow a camera direction, but a function is turned ON (the eye line remains to face toward a direction at the time when to face toward the direction). Namely, the PC/NPC of the subject carrying out a camera eye line carries out the camera eye line when the fixed time elapses after the transition of the group posing mode, and faces toward the camera direction at the time when the camera eye line started. Further, in a case where an "emoting that has been carried out finally" by the PC of the subject is "eye line following: cancel", a direction of a body of the character itself is caused to face toward the camera direction. Hereinafter, eye line following determination and rotation prohibiting determination will be described briefly.

The eye line following determination means determination whether an eye line of a subject follows the virtual camera or not in a case where the position of the virtual camera is moved during the group posing mode. A method of the eye line following determination is not limited particularly. In the present embodiment, the user can arbitrarily set up whether the eye line of the subject follows the virtual camera or not.

The rotation prohibiting determination means determination whether a direction of the subject can be rotated during the group posing mode or not. A method of eye line following determination is not limited particularly. However, it is preferable that a processing load required for the determination does not become excessive.

Further, execution of an emote (or emoting) means a function to "maintain an emoting that has been carried out finally" by the subject PC before transition to the group posing mode, and to start the emoting at predetermined timing (for example, simultaneously or in union) by the subject PC that carried out the emoting when the fixed time elapses after transition to the group posing mode. In this regard, in the present embodiment, plural kinds of emotings are provided, and there is a difference among functions for the respective emotings. Hereinafter, a single emote and a loop emote will be described briefly.

The single emote means an emoting that is repeatedly carried out until the group posing mode is terminated.

The loop emote means an emoting that starts in a state where an emoting that becomes a loop subject is carried out and continues to loop the emoting until the group posing mode is terminated. Namely, in a case where a loop emoting includes a motion at the time of start and a basic motion are, the motion at the time of start is ignored in the group posing mode. In this regard, when the loop emote is carried out in the normal screen, storage of the basic motion is canceled.

The group posing mode is used to cut out "now or a current state" of the user and the party members, whereby a screenshot is easily photographed. The group posing mode according to the present embodiment is set up as a temporary simple event state only on this terminal (client). In the group posing mode, the character of the user who carried out the operation and a character of other user (for example, the party members) are controlled so as to carry out a camera eye line. In this regard, in the present embodiment, the character of the user who carried out the operation and the character of the other user simultaneously carry out the emoting that has been carried out finally at the coordinates when to shift to the group posing mode alternatively or in addition to the camera eye line.

Figure 16A:
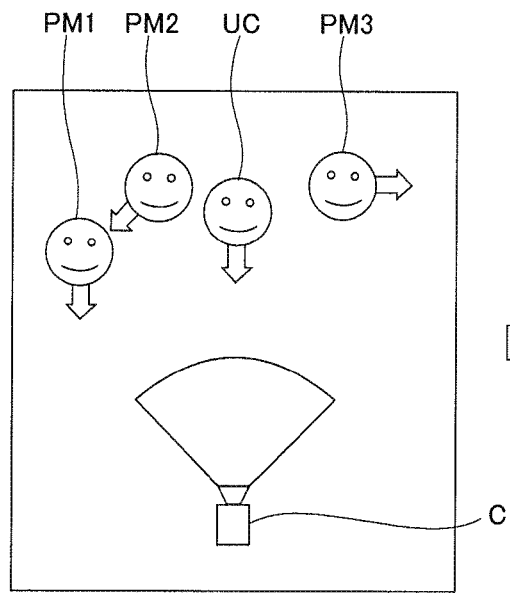
FIGS. 16A and 16B are explanatory drawings for explaining a concept corresponding to at least one of the embodiments according to the present invention.
Figure 16B:
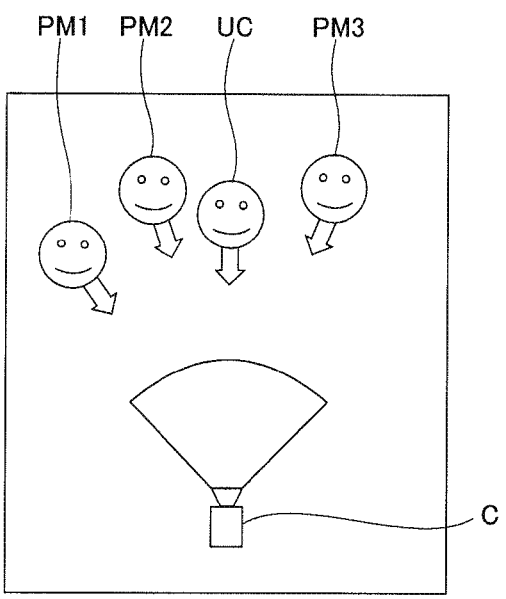

FIGS. 16A and 16B are explanatory drawings for explaining an example of the photographing mode (the group posing mode). FIG. 16A shows a virtual space corresponding to the normal screen. As shown in FIG. 16A, in the normal screen, party members PM1, PM2, PM3 exist in a field of view of a virtual camera C that photographs a user character UC, an eye line or a direction of each of the party members (see arrows of the drawings) is based on an operation by each of the users. For this reason, the eye lines or directions may be unequal.

On the other hand, FIG. 16B shows a virtual space corresponding to a game screen (the photographing screen) of the group posing mode. As shown in FIG. 16B, the party members PM1, PM2, PM3 face toward the direction of the virtual camera C in the photographing screen. Then, at this time, in the terminal of the user corresponding to each of the party members, a game screen in which his or her own user character acts on the basis of an operation of the user (the normal screen) is displayed. Namely, the photographing screen does not coincide with the normal screen.

Figure 17:
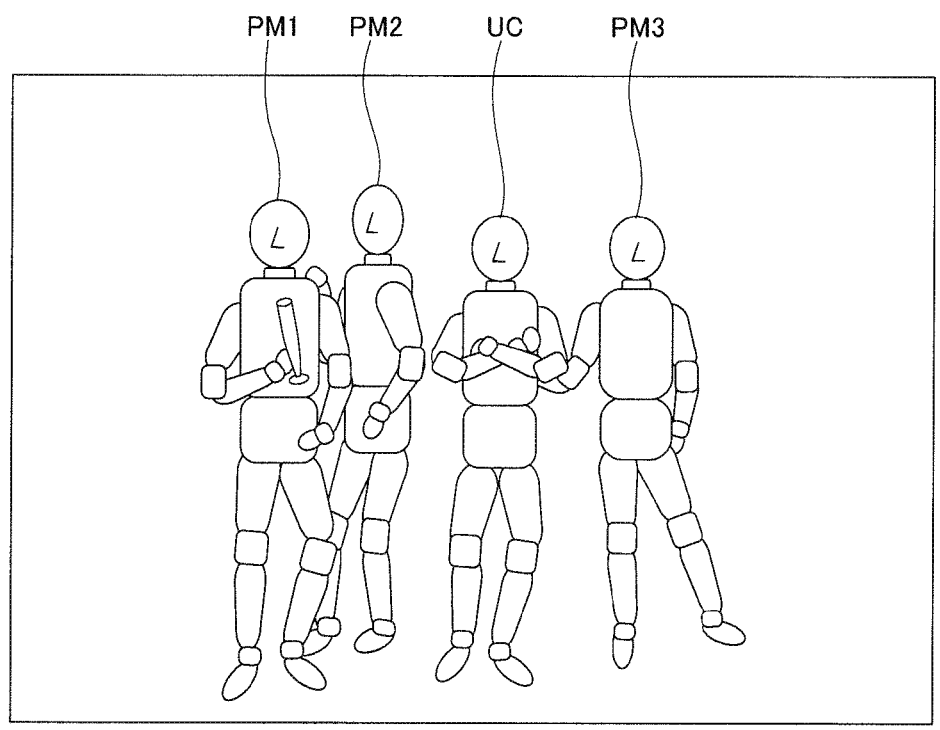
FIG. 17 is an explanatory drawing for explaining an example of a game screen corresponding to at least one of the embodiments according to the present invention.

FIG. 17 is an explanatory drawing for explaining an example of the photographing screen. As shown in FIG. 17, a game screen in which each of the user character UC and the three party members PM1, PM2, PM3 become a so-called camera eye line is displayed on the photographing screen. In this regard, in the present embodiment, the user can operate a position and a direction of the virtual camera in the photographing screen.

The storing section 24F has a function to store at least a part of the photographing screen in a predetermined storage region on the basis of a storing operation. In the present embodiment, the storing section 24F stores a still image in response to the user operation. In this regard, the video game processing system 100 may be configured so as to be capable of storing a moving image.

Figure 18:
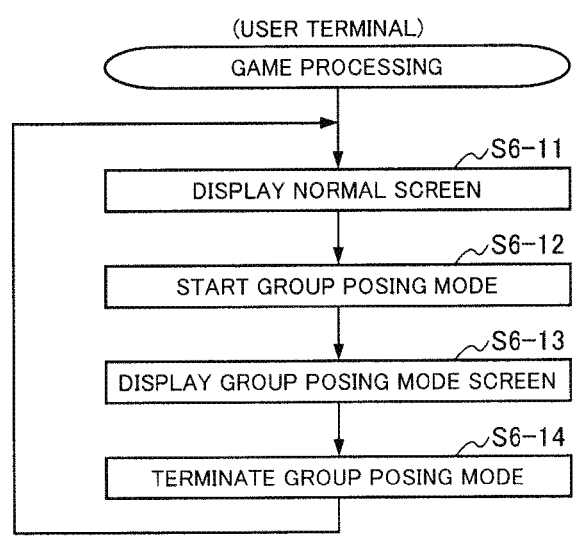
FIG. 18 is a flowchart showing an example of the game processing corresponding to at least one of the embodiments according to the present invention.

FIG. 18 is a flowchart showing an example of the game processing carried out by the terminal 20. Hereinafter, an operation of the terminal 20F will be described as an example. In this regard, an operation with the video game processing server 10 is omitted from a point of view to avoid repeated explanation.

In the game processing, the terminal 20F first displays the normal screen (Step S6-11). In the present embodiment, the terminal 20F displays, as the normal screen, a game screen in which the character of the user who operates the terminal 20F and various kinds of other objects act in a video game, which belongs to a so-called MMORPG.

The terminal 20F starts the group posing mode when a predetermined condition is satisfied while displaying the normal screen (Step S6-12). In the present embodiment, in a case where a key to which start of the group posing mode is assigned is inputted or in a case where a predetermined text command is inputted, the terminal 20F starts the group posing mode. In this regard, in the present embodiment, the group pose does not start under a specific condition. As examples of the content of the specific condition, there are a condition that the user character is jumping (including falling down), a condition that a gimmick is being controlled, a condition when to ride on a vehicle or vessel together with other character.

When the group posing mode is started, the terminal 20F displays a group posing mode screen (Step S6-13). In the present embodiment, the terminal 20F first stores recent emoting of the subject as a process to display the group posing mode screen. In this regard, a method of storing an action history of the subject is not limited particularly. However, it is preferable that overuse by the user is not carried out. Subsequently, the terminal 20F stores coordinates and a direction of the subject PC/NPC in the normal screen. In the present embodiment, the terminal 20F darken the game screen at this stage. Then, the terminal 20F displays, as the photographing screen after the darkness is terminated, a game screen (the group posing mode screen) in which the subject carries out a camera eye line and emoting.

In this regard, a PC/NPC other than the subject of the group posing mode is set to the same state as a normal state. Namely, in a case where a PC other than the subject runs through the inside of the screen, the PC runs through the inside of the screen as it is. Further, in a case where an NPC other than the subject attacks a PC, the NPC continues to attack the PC within the screen.

The terminal 20F terminates the group posing mode when a predetermined condition is satisfied while displaying the normal screen (Step S6-14). In the present embodiment, the terminal 20F terminates the group posing mode in accordance with an input of a predetermined key or an input of a text command, and returns to the normal screen. In this regard, a terminating condition (the predetermined condition) of the group posing mode is not limited particularly. For example, the terminating condition may contain a condition that forced termination is carried out by the video game processing system 100.

In this regard, the terminal 20F always receives a storing operation of the game screen by the user in principle, and stores the displaying game screen in the predetermined storage region on the basis of the storing operation.

As explained above, as one side of the sixth embodiment, the user terminal 20F that controls progress of the video game in response to an operation of the user is configured so as to include the updating section 21F, the first displaying section 22F, the second displaying section 23F, and the storing section 24F. Thus, the position of each of the characters that the one user or each of the plurality of users can operate on the virtual space is updated on the basis of the moving operation; the game screen (the normal screen) corresponding to each of the users is displayed on the basis of the update result; the game screen (the photographing screen) in which the object (the photographing subject) other than the character of the user (the user character) that satisfies the predetermined condition when the photographing operation was carried out carries out the predetermined action (photographing action) at that position is displayed on the basis of the photographing operation; and at least a part of the photographing screen is stored in the predetermined storage region on the basis of the storing operation. This makes it possible to provide the user with the video game by which it is possible to obtain a screenshot intended by the user.

In this regard, it has not been mentioned particularly in the example of the sixth embodiment described above. However, the video game processing system 100 maybe configured so that the terminal 20F maintains a state of each of the objects before the photographing screen is displayed (for example, a buff/debuff status). In this case, the video game processing system 100 may be configured so that various kinds of battle effects are reproduced while displaying the photographing screen and the emoting is not carried out if it cannot move.

In this regard, it has not been mentioned particularly in the example of the sixth embodiment described above. However, the terminal 20F may be configured so as not to display a predetermined UI while displaying the photographing screen.

In this regard, it has not been mentioned particularly in the example of the sixth embodiment described above. However, the video game processing system 100 may be configured so that the terminal 20F can switch poses of various kinds of objects while displaying the photographing screen. In this case, for example, the video game processing system 100 may be configured so as to determine a series of actions and a display form (for example, expression) corresponding to each of the objects on the basis of an operation of the user. Further, the video game processing system 100 may be configured so that a common action and display form are applied to the objects that satisfies the predetermined condition (for example, all of the user characters thus displayed) on the basis of an operation of the user.

In this regard, it has not been mentioned particularly in the example of the sixth embodiment described above. However, the video game processing system 100 may be configured so that the terminal 20F changes a display range of the virtual space on the basis of a user operation. In this case, for example, the video game processing system 100 may be configured so that the display range of the virtual space centering the character of the user can move in a fixed direction (for example, horizontally). Further, in this case, the video game processing system 100 may be configured so as to provide a limitation to a moving range.

In this regard, it has not been mentioned particularly in the example of the sixth embodiment described above. However, the terminal 20F may be configured so as to: determine an object of the user character and photographing subject as a standard; specify a drawing range of the virtual space on the basis of the position of the object determined as the standard; and display a game screen generated on the basis of the drawing range. By configuring the video game processing system 100 in this manner, it becomes possible to cause a PC/NPC other than his or her own character as the subject of the group pose to watch (or take a look at) the virtual camera. In this regard, the configuration to determine an object that becomes a standard is not limited particularly. However, it is preferable that the video game processing system 100 is configured so that the user can recognize the object that becomes the standard. As an example of such a configuration, there is a configuration in which the user is caused to select an object that becomes a standard.

In this regard, it has not been mentioned particularly in the example of the sixth embodiment described above. However, the video game processing system 100 may be configured so that the object other than the user character contains an object that can act on the basis of at least one of the position and the action of the user character. By configuring the video game processing system 100 in this manner, it becomes possible to include an object whose influence on a user operation is large in a subject of a group pose. In this regard, as examples of such an object, there are a so-called summon monster and a pet.

In this regard, it has not been mentioned particularly in the example of the sixth embodiment described above. However, the terminal 20F may be configured so as to: cause the photographing subject to start the photographing action when the photographing screen is displayed; stop the photographing action on the basis of an operation of the user; and restart the photographing action on the basis of an operation of the user. By configuring the terminal 20F in this manner, it is possible to enhance a degree of freedom of a photographing method. In this case, the video game processing system 100 may be configured so as to display, as the photographing screen, a game screen in which the photographing subject is in a state corresponding to the stopping time when the photographing action is stopped. Further, in a case where the video game processing system 100 is configured in this manner, the video game processing system 100 may also be configured so that: the terminal 20F changes the position of the virtual camera while stopping the photographing action; causes, after stopping, the photographing subject to return to a state before start of the photographing action; and causes, when to restart, the photographing subject to face toward a direction to the changed position of the virtual camera. By configuring the video game processing system 100 in this manner, for example, it is possible to set up the camera eye line at the start of the group pose, and it is also possible to change the direction of the camera eye line during the group pose. Namely, for example, the following display can be realized: the photographing subject is displayed by the camera eye line at the time of start of group pose; when a stopping operation is received from the user, the photographing subject that faces toward an original eye line (that is, a direction toward which the photographing subject faces before start of the group pose) is displayed; and when the direction of the camera is changed in response to the user operation and the camera eye line is restarted, the photographing subject whose eye line faces toward a current camera direction (each direction of the body in a case of a motion that takes swinging) is displayed. In this regard, as an example of the configuration to display the photographing subject that faces toward the original eye line, there is a configuration in which an eye line point toward which the photographing subject faces before start of photograph is maintained for a predetermined period of time (for example, from the start to an end of the photograph).

In this regard, it has not been mentioned particularly in the example of the sixth embodiment described above. However, the terminal 20F maybe configured so as to: control the virtual camera so that the user character is positioned at a predetermined position in the game screen when the normal screen is displayed; and control the virtual camera so that the user character is positioned at a different position from the predetermined position when the photographing screen is displayed. By configuring the video game processing system 100 in this manner, it is possible to gather characters at a lower right of a frame and to photograph the characters. In this regard, the video game processing system 100 may be configured so that the user character gets out of the game screen. Further, the configuration to operate the direction of the virtual camera is not limited particularly. However, it is preferable that the user is allowed to input an operation (that is, a tilt and pan operation) for changing the direction of the virtual camera vertically or horizontally.

In this regard, it has not been mentioned particularly in the example of the sixth embodiment described above. However, the video game processing system 100 may be configured so that the terminal 20F sets up a field depth regarding the virtual space, and displays a game screen generated using the field depth. In this regard, the configuration to set up the field depth is not limited particularly. However, it is preferable that the user is allowed to recognize the content of the field depth thus set up. As an example of such a configuration, there is a configuration in which a Ray check is carried out against a user specifying position in the game screen (for example, a point on which the user clicks by means of a mouse), and a focus is set up using a collision point as a standard.

In this regard, it has not been mentioned particularly in the example of the sixth embodiment described above. However, the video game processing system 100 may be configured so that the terminal 20F sets up a filtering regarding the game screen, and stores at least a part of the photographing screen, to which the filtering is set up, in a predetermined storage region. By configuring the video game processing system 100 in this manner, it becomes possible to provide the user with a video game by which it is further possible to obtain a screenshot intended by the user. In this regard, the configuration of the filter is not limited particularly. However, it is preferable that the video game processing system 100 implements a plurality of filtering patterns, and the user is allowed to arbitrarily select a filtering. As an example of the filtering, there is one by a sepia tone.

As explained above, one or two or more shortages are solved by each of the embodiments of the present application. In this regard, the effects by each of the embodiments are non-limiting effects or one example of effects.

In this regard, in each of the embodiments described above, each of the plurality of user terminals 20, 201 to 20N and the video game processing server 10 carries out the various kinds of processings described above in accordance with various kinds of control programs (for example, a video game processing program) stored in the storage device with which the corresponding terminal or server is provided.

Further, the configuration of the video game processing system 100 is not limited to the configuration that has been explained as the example of the respective embodiments described above. For example, the video game processing server 10 may be configured so that a part or all of the processings that have been explained as the processings carried out by the user terminal is carried out by the video game processing server 10. Alternatively, the video game processing system 100 may be configured so that a part or all of the processings that have been explained as the processings carried out by the video game processing server 10 is carried out by any of the plurality of user terminals 20 and 201 to 20N (for example, the user terminal 20). Further, the video game processing system 100 may be configured so that a part or all of the storage sections included by the video game processing server 10 is included in any of the plurality of user terminals 20 and 201 to 20N. Namely, the video game processing system 100 may be configured so that a part or all of the functions included in any one of the user terminal 201 and the video game processing server 10 according to the video game processing system 100 is included in the other.

Further, the video game processing program may be configured so as to cause a single apparatus that does not include a communication network to realize a part or all of the functions, which have been explained as the examples of the respective embodiments described above.

In this regard, the word "in accordance with progress of the video game" means that occurrence of various kinds of progress or changes and the like that can be generated in the video game becomes timing or a standard of the processing of specifying. As an example of the processing of specifying, there are a determining process, an information updating process and the like. Further, as examples of the various kinds of progress or changes that can be generated in the video game, there are progress of time, a change in the game element value, a specific status or update of a flag, an operation input by the user, and the like.

APPENDIX

The explanation of the embodiments described above has been described so that the following inventions can be at least realized by a person having a normal skill in the art to which the present invention belongs.

(1)

A non-transitory computer-readable medium including a video game processing program product for causing a user terminal to realize functions to control progress of a video game in response to an operation of a user, wherein the functions include:

an updating function configured to update a position of a character on a virtual space on the basis of a moving operation by one user or a plurality of users, the one user or each of the plurality of users being capable of operating the character;

a first displaying function configured to display a game screen (hereinafter, referred to as a "normal screen") corresponding to the one user or each of the plurality of users on the basis of an update result by the updating function;

a second displaying function configured to display a game screen (hereinafter, referred to as a "photographing screen") on the basis of a photographing operation, an object other than the character of the user (hereinafter, referred to as a "user character") carrying out a predetermined action (hereinafter, referred to as a "photographing action") on the photographing screen when the photographing operation is carried out, the object (hereinafter, referred to as a "photographing subject") satisfying a predetermined condition; and a storing function configured to store at least a part of the photographing screen in a predetermined storage region on the basis of a storing operation.

(1-1)

The non-transitory computer-readable medium according to claim (1), wherein the photographing subject includes a character that acts in accordance with a character of the other user than the user who carried out the photographing operation or a predetermined rule.

(1-2)

The non-transitory computer-readable medium according to claim (1) or (1-1), wherein the photographing action is an action that is carried out at a position at which the photographing subject is positioned when the photographing operation was carried out or a position determined on the basis of the position.

(2)

The non-transitory computer-readable medium according to claim (1), wherein the second displaying function includes a function configured to display a photographing screen in which an eye of the photographing subject face toward a position of a virtual camera.

(3)

The non-transitory computer-readable medium according to claim (1) or (2), wherein the updating function includes a function configured to update a position of each of the user characters in a case where the photographing operation is carried out, and wherein the first displaying function includes a function configured to cause the user terminal operated by the user to display the normal screen in a case where the user who carried out the photographing operation satisfies a terminating condition.

(4)

The non-transitory computer-readable medium according to any one of claims (1) to (3), wherein the functions further include:

an executing function configured to cause the user character to carry out a series of actions, and wherein the second displaying function includes a function configured to display a photographing screen in which the series of actions defined in advance are carried out as at least a part of the photographing action.

(4-1)

The non-transitory computer-readable medium according to claim (4), wherein the second displaying function includes a function configured to display a photographing screen in which at least a part of the series of actions is repeated as the photographing action.

(4-2)

The non-transitory computer-readable medium according to claim (4) or (4-1), wherein the second displaying function includes a function configured to display a photographing screen in which each of a plurality of user characters starts the series of actions at predetermined timing as the photographing action in a case where the plurality of user characters are the photographing subject.

(4-3)

The non-transitory computer-readable medium according to any one of claims (4) to (4-2), wherein the second displaying function includes a function configured to display, on the basis of a kind of the series of actions, a photographing screen in which at least one of an eye and a body of the photographing subject faces toward a position of a virtual camera.

(4-4)

The non-transitory computer-readable medium according to any one of claims (4) to (4-3), wherein the second displaying function includes a function configured to display a photographing screen in which the series of actions that have been carried out before the photographing operation are contained in the photographing action.

(5)

The non-transitory computer-readable medium according to any one of claims (1) to (4), wherein the functions further include:

a setting function configured to set up a form of the photographing subject or the content of the photographing action on the basis of an operation by the user who carried out the photographing operation.

(6)

The non-transitory computer-readable medium according to any one of claims (1) to (5), wherein the second displaying function includes a function configured to cause the user terminal to display a photographing screen in which a character that is positioned within a range set up for a virtual camera corresponding to the user who carried out the photographing operation is included in the photographing subject.

(7)

The non-transitory computer-readable medium according to any one of claims (1) to (6), wherein the second displaying function includes a function configured to cause the user terminal to display a photographing screen in which a user character of other user associated with the user who carried out the photographing operation is included in the photographing subject.

(A)

The non-transitory computer-readable medium according to any one of claims (1) to (7), wherein the functions further include:

a standard determining function configured to determine an object of the user character and the photographing subject as a standard; and a specifying function configured to specify a drawing range of the virtual space on the basis of a position of the object that is determined as the standard, and wherein the second displaying function includes a function configured to display a game screen that is generated on the basis of the drawing range.

(B)

The non-transitory computer-readable medium according to any one of claims (1) to (7) and (A), wherein an object other than the user character contains an object that can act on the basis of at least one of the position and the action of the user character.

(C)

The non-transitory computer-readable medium according to any one of claims (1) to (7), (A) and (B), wherein the functions further include:

a starting function configured to cause the photographing subject to start the photographing action when the photographing screen is displayed by the second displaying function;

a stopping function configured to stop the photographing action on the basis of an operation of the user; and a restarting function configured to restart the photographing action on the basis of an operation of the user, wherein the second displaying function includes a function configured to display, as the photographing screen, a game screen in which the photographing subject is in a state corresponding to a stopping time when the photographing action is stopped by the stopping function.

(C-1)

The non-transitory computer-readable medium according to claim (C),
wherein the functions further include:
a changing function configured to change a position of a virtual camera while the stopping function stops the photographing action,
wherein the stopping function includes a function configured to cause, after stopping, the photographing subject to return to a state before start of the photographing action, and
wherein the restarting function includes a function configured to cause, when to restart, the photographing subject to face toward a direction to the position changed by the changing function of the virtual camera.

(D)

The non-transitory computer-readable medium according to any one of claims (1) to (7), and (A) to (C),
wherein the functions further include:
a first controlling function configured to control the virtual camera so that the user character is positioned at a predetermined position in the game screen when the normal screen is displayed; and
a second controlling function configured to control the virtual camera so that the user character is positioned at a position different from the predetermined position when the photographing screen is displayed.

(E)

The non-transitory computer-readable medium according to any one of claims (1) to (7), and (A) to (D),
wherein the functions further include:
a field depth setting function configured to set up a field depth regarding the virtual space, and
wherein the displaying function includes a function configured to display a game screen generated using the field depth.

(F)

The non-transitory computer-readable medium according to any one of claims (1) to (7), and (A) to (E),
wherein the functions further include:
a filter setting function configured to set up a filtering regarding the game screen, and
wherein the storing function includes a function configured to store at least apart of the photographing screen to which the filtering is set up by the setting function in a predetermined storage region.

(8)

A non-transitory computer-readable medium including a video game processing program for causing a server to realize at least one of the functions that the video game processing program according to any one of claims (1) to (7) and (A) to
(F) causes the user terminal to realize, the server being capable of communicating with the user terminal.

(9)

A user terminal in which the video game processing program described in any one of claims (1) to (8) and (A) to (F) is installed.

(10)

A video game processing system including a communication network, a server and a user terminal, the video game processing system configured to control progress of a video game in response to an operation of a user, the video game processing system comprising:
an updating section configured to update a position of a character on a virtual space on the basis of a moving operation by one user or a plurality of users, the one user or each of the plurality of users being capable of operating the character;
a first displaying section configured to display a game screen (hereinafter, referred to as a "normal screen") corresponding to the one user or each of the plurality of users on the basis of an update result by the updating function;
a second displaying section configured to display a game screen (hereinafter, referred to as a "photographing screen") on the basis of a photographing operation, an object other than the character of the user (hereinafter, referred to as a "user character") carrying out a predetermined action (hereinafter, referred to as a "photographing action") on the photographing screen when the photographing operation is carried out, the object (hereinafter, referred to as a "photographing subject") satisfying a predetermined condition; and
a storing section configured to store at least a part of the photographing screen in a predetermined storage region on the basis of a storing operation.

(11)

The video game processing system according to claim (10),
wherein the server comprises the updating section, the first displaying section, the second displaying section, and the storing section, and
wherein the user terminal comprises:
a receiving section configured to receive information from the server, the information being used to output a game screen indicating the normal screen and the photographing screen on a display screen of a display device.

(12)

A non-transitory computer-readable medium including a video game processing program product for causing a server to realize functions to control progress of a video game in response to an operation of a user,
wherein the functions include:
an updating function configured to update a position of a character on a virtual space on the basis of a moving operation by one user or a plurality of users, the one user or each of the plurality of users being capable of operating the character;
a first displaying function configured to cause a user terminal to display a game screen (hereinafter, referred to as a "normal screen") corresponding to the one user or each of the plurality of users on the basis of an update result by the updating function, the user terminal being operated by the one user or each of the plurality of users;
a second displaying function configured to cause the user terminal to display a game screen (hereinafter, referred to as a "photographing screen") on the basis of a photographing operation, an object other than the character of the user (hereinafter, referred to as a "user character") carrying out a predetermined action (hereinafter, referred to as a "photographing action") on the photographing screen when the photographing operation is carried out, the object (hereinafter, referred to as a "photographing subject") satisfying a predetermined condition; and
a storing function configured to store at least a part of the photographing screen in a predetermined storage region on the basis of a storing operation.

(13)

A non-transitory computer-readable medium including a video game processing program product for causing a server to realize functions to control progress of a video game in response to an operation of a user, wherein the functions include:
an updating function configured to update a position of a character on a virtual space on the basis of a moving operation by one user or a plurality of users, the one user or each of the plurality of users being capable of operating the character;
a first displaying function configured to cause a user terminal to display a game screen (hereinafter, referred to as a "normal screen") corresponding to the one user or each of the plurality of users on the basis of an update result by the updating function, the user terminal being operated by the one user or each of the plurality of users;
a second displaying function configured to cause the user terminal to display a game screen (hereinafter, referred to as a "photographing screen") on the basis of a photographing operation, an object other than the character of the user (hereinafter, referred to as a "user character") carrying out a predetermined action (hereinafter, referred to as a "photographing action") on the photographing screen when the photographing operation is carried out, the object (hereinafter, referred to as a "photographing subject") satisfying a predetermined condition; and
a storing function configured to store at least a part of the photographing screen in a predetermined storage region on the basis of a storing operation,
wherein the video game processing program product causes the user terminal to realize a function configured to receive information from the server, the information being used to output a game screen indicating the normal screen and the photographing screen on a display screen of a display device.

(14)
A non-transitory computer-readable medium including a video game processing program for causing a user terminal to realize at least one of the functions that the video game processing program according to claim (12) causes the server to realize, the user terminal being capable of communicating with the server.

(15)
A server in which the video game processing program described in any one of claims (12) to (14) is installed.

(16)
A video game processing method of controlling progress of a video game in response to an operation of a user, the video game processing method comprising:
an updating process configured to update a position of a character on a virtual space on the basis of a moving operation by one user or a plurality of users, the one user or each of the plurality of users being capable of operating the character;
a first displaying process configured to display a game screen (hereinafter, referred to as a "normal screen") corresponding to the one user or each of the plurality of users on the basis of an update result by the updating process;
a second displaying process configured to display a game screen (hereinafter, referred to as a "photographing screen") on the basis of a photographing operation, an object other than the character of the user (hereinafter, referred to as a "user character") carrying out a predetermined action (hereinafter, referred to as a "photographing action") on the photographing screen when the photographing operation is carried out, the object (hereinafter, referred to as a "photographing subject") satisfying a predetermined condition; and
a storing process configured to store at least a part of the photographing screen in a predetermined storage region on the basis of a storing operation.

(17)
A video game processing method of controlling progress of a video game in response to an operation of a user, a video game processing system carrying out the video game processing method, the video game processing system comprising a communication network, a server, and a user terminal, the video game processing method comprising:
an updating process configured to update a position of a character on a virtual space on the basis of a moving operation by one user or a plurality of users, the one user or each of the plurality of users being capable of operating the character;
a first displaying process configured to display a game screen (hereinafter, referred to as a "normal screen") corresponding to the one user or each of the plurality of users on the basis of an update result by the updating process;
a second displaying process configured to display a game screen (hereinafter, referred to as a "photographing screen") on the basis of a photographing operation, an object other than the character of the user (hereinafter, referred to as a "user character") carrying out a predetermined action (hereinafter, referred to as a "photographing action") on the photographing screen when the photographing operation is carried out, the object (hereinafter, referred to as a "photographing subject") satisfying a predetermined condition; and
a storing process configured to store at least a part of the photographing screen in a predetermined storage region on the basis of a storing operation.

According to one of the embodiments of the present invention, it is useful to provide a player with a video game in which it is easy to obtain an intended screenshot.

What is claimed is:
1. A non-transitory computer-readable medium including a program product for causing a user terminal to realize first functions to photograph a game screen, the user terminal being configured to realize second functions to control progress of a video game in response to an operation of a user, the user operating a user character by using the user terminal, the second functions comprising:
   an updating function configured to update a position of a character on a virtual space based on a moving operation by the user; and
   a first displaying function configured to display, in a normal mode, a normal game screen corresponding to the user based on an update result by the updating function,
   wherein a status of the normal mode of the video game is configured to be updated in a first case while a photographing game screen is displayed in a photographing mode, and
   the first functions comprise:
      a second displaying function configured to display, in the photographing mode, the photographing game screen; and
      a photographing function configured to photograph the displayed photographing game screen based on a photographing operation.

2. The non-transitory computer-readable medium according to claim 1,
   wherein, in a second case where the user operates the user character to change a position of the user character while the photographing game screen is displayed in the photographing mode, the change in the position of the user character does not affect the status of the normal mode of the video game.

3. The non-transitory computer-readable medium according to claim 2,
wherein the status of the normal mode of the video game is configured to be updated in the first case where the user operates the photographing operation while the photographing game screen is displayed in the photographing mode.

4. The non-transitory computer-readable medium according to claim 2,
wherein the first displaying function is further configured to display the normal game screen in a third case while the photographing game screen is displayed in the photographing mode.

5. The non-transitory computer-readable medium according to claim 4,
wherein the first displaying function is configured to display the normal game screen in the third case where the user satisfies a terminating condition while the photographing game screen is displayed in the photographing mode.

6. The non-transitory computer-readable medium according to claim 5,
wherein the terminating condition includes a predetermined operation by the user being received.

7. The non-transitory computer-readable medium according to claim 2,
wherein, in a third case where the user repositions the user character while the photographing game screen is displayed in the photographing mode, positional information of the user character in the normal mode of the video game is not affected.

8. A video game processing terminal configured to photograph a game screen, and to control progress of a video game in response to an operation of a user, the user operating a user character by using the video game processing terminal, the video game processing terminal comprising:
an updating section configured to update a position of a character on a virtual space based on a moving operation by the user; and
a first displaying section configured to display, in a normal mode, a normal game screen corresponding to the user based on an update result by the updating section,
wherein a status of the normal mode of the video game is configured to be updated in a first case while a photographing game screen is displayed in a photographing mode,
the video game processing terminal further comprises:
a displaying section configured to display, in the photographing mode, the photographing game screen; and
a photographing section configured to photograph the displayed photographing game screen based on a photographing operation.

9. The video game processing terminal according to claim 8,
wherein, in a second case where the user operates the user character to change a position of the user character while the photographing game screen is displayed in the photographing mode, the change in the position of the user character does not affect the status of the normal mode of the video game.

10. The video game processing terminal according to claim 9,
wherein the status of the normal mode of the video game is configured to be updated in the first case where the user operates the photographing operation while the photographing game screen is displayed in the photographing mode.

11. The video game processing terminal according to claim 9,
wherein the first displaying section is further configured to display the normal game screen in a third case while the photographing game screen is displayed in the photographing mode.

12. The video game processing terminal according to claim 11,
wherein the first displaying section is configured to display the normal game screen in the third case where the user satisfies a terminating condition while the photographing game screen is displayed in the photographing mode.

13. The video game processing terminal according to claim 12,
wherein the terminating condition includes a predetermined operation by the user being received.

14. The video game processing terminal according to claim 9,
wherein, in a third case where the user repositions the user character while the photographing game screen is displayed in the photographing mode, positional information of the user character in the normal mode of the video game is not affected.

15. A video game processing method of photographing a game screen, and controlling progress of a video game in response to an operation of a user, the user operating a user character by using a user terminal, the video game processing method comprising:
updating a position of a character on a virtual space based on a moving operation by the user; and
displaying, on the user terminal and in a normal mode, a normal game screen corresponding to the user based on an update result by the updating,
wherein a status of the normal mode of the video game is configured to be updated in a first case while a photographing game screen is displayed in a photographing mode, and
the video game processing method further comprises:
displaying, in the photographing mode, the photographing game screen; and
photographing the displayed photographing game screen based on a photographing operation.

16. The video game processing method according to claim 15,
wherein, in a second case where the user operates the user character to change a position of the user character while the photographing game screen is displayed in the photographing mode, the change in the position of the user character does not affect the status of the normal mode of the video game.

17. The video game processing method according to claim 16,
wherein the status of the normal mode of the video game is configured to be updated in the first case where the user operates the photographing operation while the photographing game screen is displayed in the photographing mode.

18. The video game processing method according to claim 16,
wherein the normal game screen is displayed in a third case while the photographing game screen is displayed in the photographing mode.

19. The video game processing method according to claim 18,
wherein the normal game screen is displayed in the third case where the user satisfies a terminating condition while the photographing game screen is displayed in the photographing mode.

20. The video game processing method according to claim 16,
wherein, in a third case where the user repositions the user character while the photographing game screen is displayed in the photographing mode, positional information of the user character in the normal mode of the video game is not affected.

* * * * *